(12) United States Patent
Frattini et al.

(10) Patent No.: US 9,589,690 B2
(45) Date of Patent: Mar. 7, 2017

(54) LIGHT WATER REACTOR PRIMARY COOLANT ACTIVITY CLEANUP

(75) Inventors: Paul L. Frattini, Los Altos, CA (US); Roger Howard Asay, Salinas, CA (US); Keith Paul Fruzzetti, San Jose, CA (US); Susan Elaine Garcia, Paso Robles, CA (US); Richard Herbert Kohlmann, Plainfield, IL (US); Daniel Morgan Wells, San Mateo, CA (US)

(73) Assignee: ELECTRIC POWER RESEARCH INSTITUTE, INC., Charlotte, NC (US)

( * ) Notice: Subject to any disclaimer, the term of this patent is extended or adjusted under 35 U.S.C. 154(b) by 637 days.

(21) Appl. No.: 13/303,211

(22) Filed: Nov. 23, 2011

(65) Prior Publication Data

US 2012/0183115 A1 Jul. 19, 2012

Related U.S. Application Data

(60) Provisional application No. 61/423,282, filed on Dec. 15, 2010.

(51) Int. Cl.
*G21F 9/12* (2006.01)
*B01J 45/00* (2006.01)

(52) U.S. Cl.
CPC ............... *G21F 9/12* (2013.01); *B01J 45/00* (2013.01)

(58) Field of Classification Search
None
See application file for complete search history.

(56) References Cited

U.S. PATENT DOCUMENTS

| | | | |
|---|---|---|---|
| 4,077,901 A | 3/1978 | Arnold et al. | |
| 4,284,512 A | 8/1981 | Hodgkin | |
| 4,659,512 A | 4/1987 | Macedo et al. | |
| 4,764,338 A | 8/1988 | Uchida et al. | |
| 4,793,947 A | 12/1988 | Izumida et al. | |
| 4,880,595 A | 11/1989 | Matsuda et al. | |
| 5,087,372 A | 2/1992 | Toyomoto et al. | |
| 5,403,492 A * | 4/1995 | Salem | C02F 1/42 210/683 |
| 5,478,474 A | 12/1995 | Katti et al. | |

(Continued)

FOREIGN PATENT DOCUMENTS

JP 2010048609 3/2010

OTHER PUBLICATIONS

Gilbertson, Mark, et al. "Rational Design of Metal Ion Sequestering Agents." (1999). <http://www.osti.gov/em52/final_reports/60370.pdf>.*

(Continued)

*Primary Examiner* — Jack W Keith
*Assistant Examiner* — Lily C Garner
(74) *Attorney, Agent, or Firm* — Trego, Hines & Ladenheim, PLLC; Brandon Trego; Jonathan Hines

(57) ABSTRACT

A method for the cleanup of ionic species such as cobalt and nickel in nuclear power plant aqueous streams using a sequestration resin material is disclosed herein. The method includes the steps of providing a sequestration resin for removal of radioisotopes of transition metal impurities contained in the plant process streams, and distributing the sequestration resin into the plant process streams such that the sequestration resin interacts with the process streams and removes the transition metal impurities.

14 Claims, 13 Drawing Sheets

(56) References Cited

U.S. PATENT DOCUMENTS

| | | | |
|---|---|---|---|
| 5,545,798 | A | 8/1996 | Elliott |
| 5,707,922 | A | 1/1998 | Mimori et al. |
| 5,770,070 | A | 6/1998 | Davis et al. |
| 5,976,358 | A | 11/1999 | Sartori et al. |
| 6,113,796 | A | 9/2000 | Tounissou et al. |
| 6,153,795 | A * | 11/2000 | Biçak .............................. 564/84 |
| 6,165,367 | A | 12/2000 | Partridge |
| 6,387,274 | B1 | 5/2002 | Hendricks et al. |
| 6,652,661 | B2 | 11/2003 | Martin |
| 6,852,802 | B1 | 2/2005 | Komatsu et al. |
| 7,030,205 | B2 | 4/2006 | Foster, Jr. et al. |
| 7,083,732 | B1 | 8/2006 | Chollet et al. |
| 7,122,848 | B2 * | 10/2006 | Nishida ................ B01J 31/1616 257/184 |
| 7,323,109 | B2 | 1/2008 | Bringley |
| 7,527,733 | B2 | 5/2009 | McKenna et al. |
| 7,799,143 | B2 | 9/2010 | Elmore et al. |
| 2002/0036166 | A1 | 3/2002 | Petty et al. |
| 2002/0168773 | A1 | 11/2002 | Ito et al. |
| 2004/0035443 | A1 | 2/2004 | Yaita et al. |
| 2009/0101586 | A1 * | 4/2009 | Brings ...................... G21F 9/12 210/682 |
| 2009/0218289 | A1 | 9/2009 | Brings et al. |

OTHER PUBLICATIONS

Min, X., Qing, C., Jinjin, C., "Study on the Treatment of Wastewater Containing Mercury by Macromolecular Heavy Metal Flocculant Mercaptoacetyl Polyethyleneimine", "Water Environment Research", Sep. 2010, pp. 790-796, vol. 82, No. 9.

Santos, M.A., Grazina, R., "A New Immobilized Hydroxypyridinone as a Sequestering Agent for Heavy Metal Ions", "Journal De Physique IV", May 2003, pp. 1185-1188, vol. 107, No. II, EDP Sciences, France.

Oshita, K., Motomizu, S., "Development of Chelating Resins and Their Ability of Collection and Separation for Metal Ions", "The Japan Society for Analytical Chemistry", Mar. 2008, pp. 291-311, vol. 57, No. 5, Bunseki Kagaku, Japan.

Bicak, N., Koze, G., Atay, T., "Metal Chelating Resins by Condensation of Ethylene Diamine with p-Dicholoromethyl Benzene", "Journal of Applied Polymer Science", Aug. 1996, pp. 799-804, vol. 61, No. 5, John Wiley & Sons, Inc.

Dev, K., Rao, G.N., "Synthesis and Analytical Properties of a Chelating Resin Funtionalised with bis-(N, N'-salicylidene) 1,3-propanediamine Ligands", "Talanta", 1996, pp. 451-457, vol. 43, No. 3, Elsevier Science B.V.

Navarro, R.R., Sumi, K., Matsumura, M., "Heavy Metal Sequestration Properties of a New Amine-Type Chelating Adsorbent", "Water Science and Technology", 1998, pp. 195-201, vol. 38, No. 4-5, Elsevier Science Ltd., Great Britain.

Chen, C.Y., Chiang, C.L., Chen, C.R., "Removal of Heavy Metal Ions by a Chelating Resin Containing Glycine as Chelating Groups", "Separation and Purification Technology", 2007, pp. 396-403, vol. 54, Elsevier B.V.

Rivas, B.L., Seguel, G.V., Geckeler, K.E., "Synthesis, Characterization, and Properties of Polychelates of Poly (Styrene Sulfonic Acid-co-Maleic Acid) With Co(II),Cu(II), Ni(II), and Zn(II)", "Journal of Applied Polymer Science", Sep. 2002, pp. 2546-2551, vol. 85, No. 12, Wiley Periodicals, Inc., USA.

Bicak, N.; Senkal, B.F.; Melekaslan, D., "Poly (styrene sulfonamides) with EDTA-Like Chelating Groups for Removal of Transition Metal Ions", Journal of Applied Polymer Science, 2000, pp. 2749-2755, vol. 77, John Wiley & Sons, Inc.

Bicak, N.; Senkal, B.F., "Polystyrene Sulfonic Acid Esters as Alkylating Agents: Preparation of Unsymmetrical Secondary Amines", Reactive & Functional Polymers, 1996, pp. 123-128, vol. 29. Elsevier Science B.V.

Bicak, N.; Senkal, B.F.; Yarbas, T., "Crosslinked poly(styrensesulfonamide) with iminoacetic acid Chelating Groups for Hard-Water Treatment", Macromol. Chem. Phys.,1998, pp. 2731-2735, vol. 199. Wiley-VCH.

Bicak, N.; Senkal, B.F., "Aldehyde Separation by Polymer-Supported Oligo (ethyleneimines)", Journal of Applied Polymer Science: Part A: Polymer Chemistry, 1997, pp. 2857-2864, vol. 35, John Wiley & Sons, Inc.

Fritz, J.S.; Freeze, R.C.; Thornton, M.J.; Gjerde, D.T. "Methods for Concentrating Metal Ions Prior to Analysis by Ion Chromatography or Capillary Electrophoresis", Journal of Chromatography A, 1996, pp. 57-61, vol. 739. Elsevier Science B.V.

Aikens, D.A.; Reilley, C.N., "Formation Constants of Metal Complexes", Handbook of Analytical Chemistry, pp. 1-37-1-45. McGraw-Hill, New York.

Dingman, Jr., J.; Siggia, S.; Barton, C.; Hiscock, K.B., "Concentration and Separation of Trace Metal Cations by Complexation on Polyamine-Polyurea Resins", Analytical Chemistry, Jul. 1972, pp. 1351-1357, vol. 44 No. 8.

Pyun, H.C.; Kim, K.Y.; Yoon, B.M.; Nho, Y.C., "Studies on the Characteristics of Ion Exchange Resins in the Purification System of Nuclear Power Plants", Korea Advanced Energy Research Inst., Dec. 1986, 81p, Daeduk, (Republic of Korea).

* cited by examiner

LIGHT WATER REACTOR PRIMARY COOLANT ACTIVITY CLEANUP

BACKGROUND OF THE INVENTION

This application claims the benefit of Provisional Application No. 61/423,282 filed on Dec. 15, 2010.

The present invention relates generally to the cleanup of ionic species such as cobalt and nickel in nuclear power plant aqueous streams using a sequestration resin material.

Trace amounts of radiocobalts for example are the principle source of personnel dose during refueling outages at light water reactors and at present they are removed from the reactor coolant system mostly during the initial stages of the reactor shutdown procedures thereby causing significant delays in outage critical path. Because no ion exchange cleanup system is efficient enough to cleanup the coolant during operation most of the radiocobalts end up either causing outage dose or outage delays.

The current process for removing ionic species employs ion exchange resins using a reversible ion exchange process. However, it has been found that a more efficient process is needed in the cleanup of ionic species in the aqueous streams. As a result, the present invention, proposes a methodology that employs a normally irreversible process to improve the efficacy.

BRIEF SUMMARY OF THE INVENTION

These and other shortcomings of the prior art are addressed by the present invention, which provides a methodology utilizing a "sequestering" process whereby the ionic species is no longer free to be released from the resin backbone. The use of this resin will result in reduced reactor water activity and reduced dose rates and exposures throughout the nuclear plant. Control and reduction in radwaste volumes and activities may also result from the application of these resins. This application may also be applied to feedwater, reactor water, or fuel pool systems. Ionic species removed could include, but are not limited to, cobalt and nickel.

According to one aspect of the invention, a method for decontaminating nuclear power plant process streams includes the steps of providing a sequestration resin for removal of radioisotopes of transition metal impurities contained in the plant process streams, and distributing the sequestration resin into the plant process streams such that the sequestration resin interacts with the process streams and removes the transition metal impurities.

According to another aspect of the invention, a method for decontaminating nuclear power plant process streams includes the steps of providing a sequestration resin for removal of radioisotopes of transition metal impurities contained in the plant process streams, determining an amount of anion resin to mix with the sequestration resin, floccing the sequestration resin with the anion exchange resin to assure a uniform precoat, overlaying the flocced sequestration resin over a base mix, and distributing the sequestration resin into the plant process streams such that the sequestration resin interacts with the process streams and removes the transition metal impurities.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
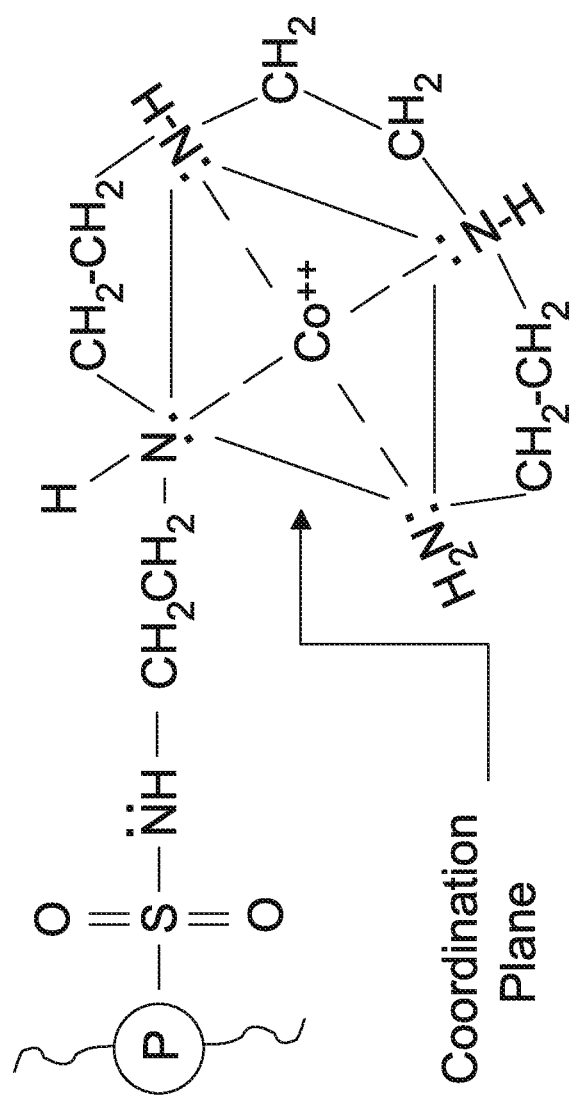
FIG. 1 shows $Co^{++}$ in coordination with active site of sequestration resin according to an embodiment of the invention.

The approach described is not based upon an ion exchange process but rather a sequestration process wherein the typical clean up resin is modified either synthetically during production or post-production by treatment with suitable novel chemicals in order to place ligand active sites on the resin that will attract and irreversibly bind cobalt ions from solution (as well as cobalt ions potentially from colloidal contaminants) via inductive coordination. This approach is specific for transition metal cations such as the production of sequestration resins using multi-amine base ligands.

The generic invention involves the synthesis of cobalt sequestration resins useful for removal of cobalt derived radioactivity from the coolant water of light water nuclear reactors. The sequestration approach to transition metal cation separation from aqueous solution takes advantage of the lone electron pairs on multiple nitrogen atoms in the amine based ligand to coordinate the cation as opposed to direct electrokinetic interaction within the pores of ion exchange resins typically used to accomplish the cation separation. This application describes a synthetic algorithm for coupling such amine bases covalently to commercially available sulfonic acid based polymer resins using a sulfonamide linkage.

The tetraethylenepentamine (TEPA) sulfonamide has been used as an intermediate in published synthesis of resin based carboxylic acid chelants for ionic cobalt, nickel, zinc and various alkali metal cations. These poly-carboxylic acid compounds tend to have a strong pH dependence in their chelation capacity for any of the ions mentioned as well as tend to be non-specific for uptake of these cations. In addition, they also tend to promote adverse formation of transition metal hydroxide precipitates within the resin pores.

Unlike other prior art resins, we begin with powdered or bead form resin substrates that have been functionalized throughout as opposed to simply on the surface because these forms are commercially available and are qualified for use in nuclear power reactors (our primary application for sequestration resins). As a result, many of our chemistries and our reaction conditions are dictated by the presence of mass transfer resistances for both reactant and product delivery to the reaction site. The strong bonding of a divalent cation deep within the physical pore structure of our resin substrates is largely unexpected from this set of prior art given its focus on surface chemistry and anion exchange.

Before discussing the sulfonamide synthesis or the physical structure of the resins themselves, it is important to recognize that the nuclear power industry application of sequestration ligands for uptake of transition metal cations in aqueous solution is distinct from the use of chelants. Specifically, the United States Nuclear Regulatory Commission in 10CRF Part 61.2 defines a chelating agent with respect to the generation of mixed waste in the nuclear power industry as an amine polycarboxylic acid (for example, EDTA, DTPA), hydroxyl-carboxylic acids, and polycarboxylic acids (for example, citric acid, carbolic acid, and gluconic acid). For purposes of this application, sequestration ligands do not include chelating agents as defined above but rather are sequences of inductive electron donating functional groups such as polyalkyl amines, or more generally functional groups containing uncharged elements like oxygen and nitrogen (for example, FIG. 12).

The separation of transition metal cations, specifically divalent cobalt, but also including cations of interest to the light water reactors such as divalent nickel or iron and trivalent iron occurs not by ion exchange, but by inductive coordination of the transition metal ion by the multiple lone pair electrons existing at neutral pH on the uncharged amino functionality of the ligand base.

The general class of compounds that constitute synthetic products are sulfonamide species wherein the sulfonamide linkage connects a backbone polystyrene divinylbenzene polymer network backbone to a ligand consisting of a multi-amine base. For example, the synthesis begins with a commercial resin material such as Graver Technologies Co. PCH (a sulfonated polystyrene divinylbenzene polymer resin that typically serves as a cation exchange media), converts the sulfonate to a sulfonyl chloride, and then links a commercially available multi-amine base such as TEPA.

Alternative approaches to coupling the multi-amine based ligand to sulfonic acid ion exchange resin that do not involve a covalent sulfonamide linkage but rather employ an ionic association via a quaternary ammonium coupling agent, an epoxide based synthesis of the quaternary coupling agent, equilibrium capacity for binding transition metal cations of interest to multi-amine based ligands, and issues related to the kinetics of sequestration resin performance in either powder or bead form are also discussed.

For example, an alternative coupling mechanisms between the polymer backbone and the sequestering ligand base involves a completely different synthesis process than what will first be described for the sulfonamide coupling. Specifically, the alternative coupling involves ionic association between the sulfonic acid functionality of PCH and a quaternary ammonium functionality that is synthetically coupled to the multi-amine sequestration ligand base. This coupling, being ionic in nature, is more sensitive to pH changes than the covalent sulfonamide coupling and therefore affords in-situ functionalization of PCH in the plant as well as pH dependent processes to release either the ligand, the $Co^{2+}$, or both into aqueous solution for downstream radioactive waste processing in the light water reactor plant. For reference, the purpose of removing $Co^{2+}$ lies in the fact that the majority of radioactive exposure experienced by workers in light water reactors comes through gamma emission by cobalt isotopes produced in the nuclear core.

Continuing then with the sulfonamide synthesis, we begin by stating the product required as a chemical formula. Specifically, we represent the polymer backbone of PCH by "—P—". Therefore, the sulfonic acid functionality of PCH is represented —P—$SO_3H$. The prior art begins with polystyrene divinylbenzene neutral backbones, that is without sulfonic acid functionality, and then creates the sulfonyl chloride intermediate —P—$SO_2Cl$ in a single step via reaction of the pendant benzene rings on the resin backbone with $ClSO_3H$, resulting in a surface functionalized polymer particle rather than functionality throughout the polymer pores as in the present invention.

The sequestration ligand, TEPA, is identified chemically as $H_2N[CH_2CH_2NH]_4H$. At this point we list several alternative ligand amines that are commercially available. Note that, in some cases, more than one ligand site exists per amine, specifically in the polyamine cases, and therefore the possibility of significantly increasing the capacity for a sequestration resin to take up transition metal cations exists via the choice of the polyamine. A sample list of amines is as follows:
ethylenediamine
diethylenetriamine (DETA)
triethylenetetramine (TETA)
tetraethylenepentamine (TEPA)
pentaethylenehexamine (PEHA)
tris(ethylamino)amine (TEAA)
polyallylamine
polyvinylamine
Polyethyleneimine (PEI), where a wide range of molecular weights is available affording multiple ligand sites when one notes that each ligand site can contain geometrically six coordination electron pairs and thermodynamically may be most stable with just five. In the case of the TEPA amine, just four lone electron pairs coordinate cobalt.

For our example synthesis, therefore, the product sulfonamide is represented as $-P-SO_2NH-[CH_2CH_2NH]_4H$.

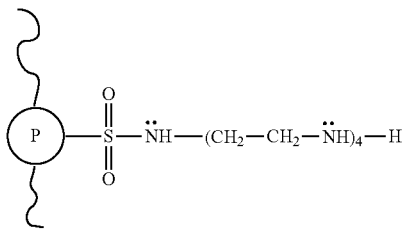

Note that

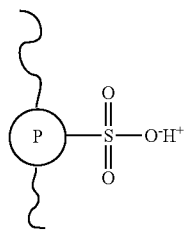

represents a polymer of styrene sulfonic acid

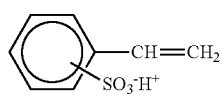

and divinylbenzene:

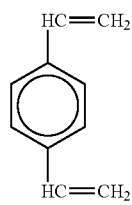

The synthetic method is as follows:
1. Wash and remove fines via sedimentation and decantation from a commercially available polystyrene divinylbenzene sulfonate cation exchange resin in powder form. Note that the synthesis can be achieved using bead form resin. Alternatively, the resin powder particles may be sized by sluicing through a series of vibrating screens of known limiting mesh openings defining both upper and lower particle sizes allowed. The typical degree of sulfonation of a material polymerized as described above can be quite high compared to surface sulfonation of polymers formed from the unsulfonated starting materials. For example, Graver PCH is approximately 88% sulfonated, meaning that 88% of the benzene rings pendant on the polymer chain are measured to contain the sulfonic acid functional group. Note that such high degrees of sulfonation necessarily imply that the sulfonic acid group must be distributed throughout the pore structure of the resin particles either in powdered form or bead form. Synthesis of acceptable cobalt sequestration resin products may also be achieved by starting with much lower degrees of sulfonation on the resin backbone. However, such starting materials in commercialized form are typically not qualified for independent use as ion exchange resins in nuclear power reactors.
2. The resin may be washed with deionized water to the neutral in pH and stored for future use and eventually dried by evaporating the water into a warm air stream in a counter current rotating kiln type of operation. Alternatively, the resin powder may be dried by using an ethanol wash and warm air stream followed by vacuum evaporation of the ethanol.
3. Continue drying the resin powder via azeotroping the interstitial water in toluene.
4. Functionalize the sulfonic acid groups for sulfonamide synthesis via a sulfonyl chloride intermediate. The resin must be completely dry. Functionalization can be accomplished in toluene using thionyl chloride. The product of this step can be represented as $-P-SO_2Cl$. We have achieved nearly 100% theoretical yield in conversion of the sulfonic acid to sulfonyl chloride in the research laboratory. The chlorination of the resin sulfonate differs from prior art approaches that begin with the non-sulfonated polystyrene divinylbenzene resin. That resin in turn is reacted with monochlorosulfonic acid ClSO3H to produce the chlorosulfonated resin directly. Prior art approaches result in far fewer sulfonyl chloride functionality in the resin backbone than can be achieved by starting with the sulfonated resin such as Graver PCH that is reported to be 88% functionalized.

Several variables have been identified as convenient indicators of reaction conversion for either the chlorination step, which produced a stable intermediate so long as it is kept isolated from water, or the amidation step which produces the final product.

Color changes: The intermediate chloride is a deep purple color. Absence of that color indicates a lack of chlorination that will result in poor conversion to the product sulfonamide. The product resin is beige to slightly tan in color for the powdered resin synthesis. In the case of beads, the final product can be significantly darker.

Elemental analysis: Elemental analysis by ashing of polymer resin based samples have been found to yield smaller than correct values for chloride and nitrogen content compared to the values calculated from sequestration capacity and synthesis stoichiometry. Therefore, a qualitative test for incorporation of nitrogen-containing compounds like TEPA into the resin matrix is used based upon the reaction of ninhydrin with less than fully substituted amines.

Fourier transform infrared peaks: Use of FTIR to identify conversion of an S—O bond to a S—Cl bond as well as to identify the S—N bond in the product sulfonamide has been successful.

5. The ligation step involves reacting the multi-amine base such as TEPA with the sulfonyl chloride resin. This step occurs in an ether solvent such as monoglyme or diglyme at 80° C. for roughly 30 minutes. The degree of conversion in solution reported in the prior art is approximately 60%. However, higher levels of conversion have been achieved in the present invention than the surface reaction case of the prior art by driving the reaction via removal of the HCl product via addition of triethylamine.

Caution with respect to keeping the resin powder in uniform suspension as the multiamine reagent is delivered is accomplished by selectively limiting delivery of the TEPA dissolved in monoglyme solvent while the chlorinated resin powder intermediate is kept in suspension in excess monoglyme solvent by stirring. In order to further facilitate transport of TEPA within the resin pores, it has been found that the addition of up to four weight percent water can be added to the monoglyme suspension without significantly hydrolyzing the intermediate.

This results in an estimated conversion and a cobalt uptake capacity by this sequestration resin product of approximately 60% to 90% for small particle powdered resins and roughly 30% to 50% for typical bead form resins. The range in each case depends upon overcoming mass transfer resistance within resin pores and between resin particles (in scale up syntheses) by changing temperature, reaction time, reactant concentration, and/or mixing methodology.

6. The synthesis product of step 5 is then cooled in an ice slush and decanted, followed by an ethanol wash and vacuum drying.

7. The ability of the resin final product to take up ionic cobalt at TEPA sites within the pores is influenced by the pore structure that remains after the final clean up washes are completed. Furthermore, the conjugate cation to the remaining sulfonic acid ion exchange sites must be acceptable to the nuclear plant since these cations may be sloughed into reactor water if the cation exchange capacity of the precoat underlay in the reactor water cleanup (RWCU) filter demineralizer is not sufficient. Also, the conjugate cation can affect the positive charge on neighbor TEPA sites which then can repel cobalt ion before it is successfully sequestered.

Wash procedures to place the remnant ionic capacity of the sulfonamide resin in various conjugate forms have been developed for the hydrogen form, the ammonium form, the tetramethylammonium form, the sodium form, and the $TEPAH^{2+}$ and $TEPAH^{3+}$ forms. In general, the nuclear power industry would prefer the hydrogen form because it is of least risk if potentially sloughed into the reactor coolant stream during water purification. The procedure for each of these forms is comparable to classic ionic exchange chemistry except for the cationic TEPA forms, which are addressed in the de-ligation chemistry section below.

8. Note that one possible byproduct of the above synthetic procedure is an ionic association between a protonated TEPA amine and an unreacted sulfonic acid group on the original PCH resin. We shall refer to this impurity as "ionic TEPA". Of the sulfonic acid sites left unconverted to sulfonamide via the above process, we find that typically at least 10% are in an ionic form conjugated by cationic forms of TEPA. Ionic TEPA must be removed from the final product in order not to compromise the analytical methods developed to follow cobalt ion uptake by sequestration resin (described below) as well as to avoid adding impurities into reactor water for applications in the nuclear power industry. The method to remove ionic TEPA is to wash the synthetic resin product thoroughly with a saturated aqueous solution of sodium chloride. The unconverted sulfonate sites will be left in the sodium form via this wash and can be converted to the hydrogen form via exposure to cold acid.

9. Another possible synthetic impurity is physisorbed ligand amine within the surface region of the resin pores. Such physisorption has been seen in the use of ion exchange resins in the presence of uncharged, usually aromatic, bases. The sequestration resin synthesized above using TEPA was investigated for the presence of physisorbed TEPA during cobalt ion uptake studies and no measurable physisorbed ligand was present on the final washed sequestration resin product.

Figure 5:
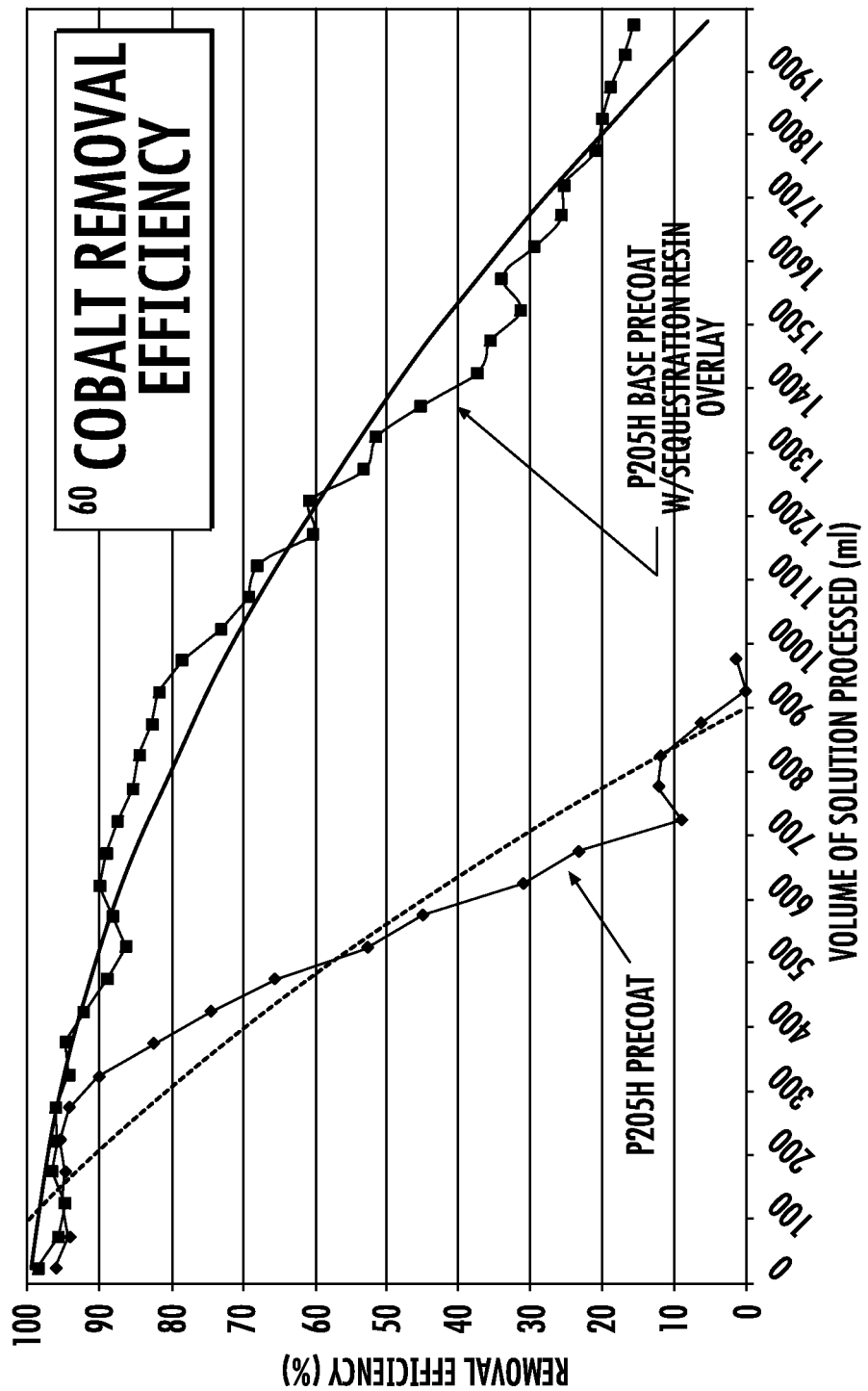
FIG. 5 shows the results of testing of resins for removal efficiency of cobalt relative to traditional ion exchange resins. The inventive resin material, synthesized in the laboratory at bench scale, showed a ~3 fold improvement in cobalt removal efficiency in testing against performance of typical commercial powdered ion exchange resin using a simulated challenge solution comparable to reactor water in a boiling water reactor nuclear power plant.
Figure 6:
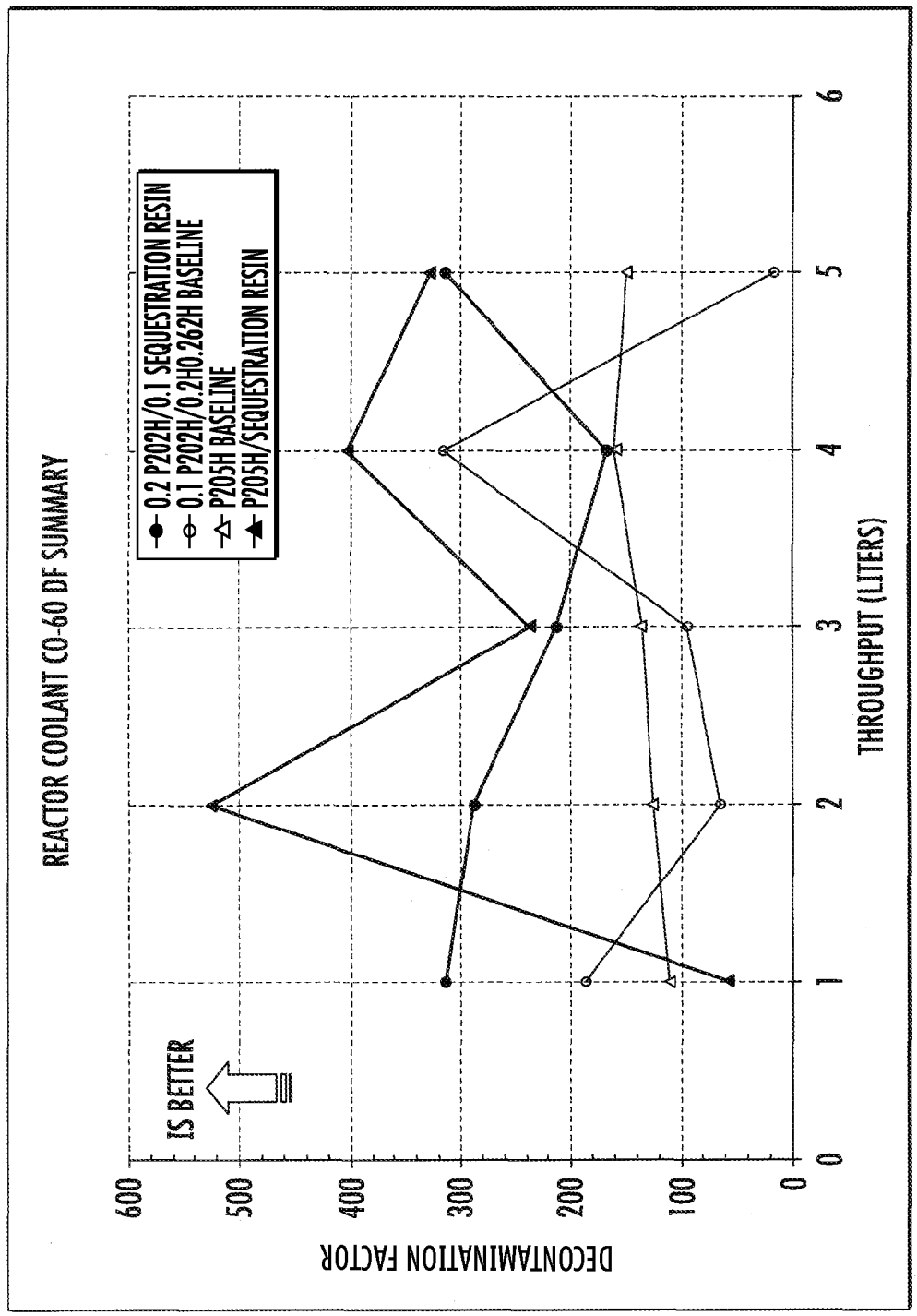
FIG. 6 shows results of testing of resins for removal efficiency of cobalt from a nuclear plant's reactor water sample relative to traditional ion exchange resins (open symbols). The inventive resin material, synthesized in the laboratory at bench scale, overlaying traditional ion exchange resins (filled symbols) showed a ~3 fold improvement in cobalt decontamination factor.

Tests of the sulfonamide linked cobalt sequestration ligand in the above resin form were conducted for radiocobalt uptake using reactor water obtained from a light water reactor (FIGS. 5 and 6). These tests suggest that the total cobalt uptake efficiency of the sequestration resin was between a factor of 2 to 4 above that achieved for a typical powder coated filter demineralizer used in the field with a combination cation and anion resin precoat. Further, tests in the laboratory indicate that ionic cobalt binding via coordination in the TEPA ligand site is essentially irreversible at neutral pH. As pH is lowered to between 1 and 3 the nitrogen within the TEPA amine are protonated and $Co^{2+}$ releases into solution. Further reduction in pH causes hydrolysis of the sulfonamide, releasing the charged ligand into solution.

These observations afford construction of systematic water treatment processes that first removes and then concentrates for radioactive waste processing and disposal of the radioactive cobalt found in the typical light water reactor primary coolant. Finally, it should be appreciated that alternative ligands to TEPA that are mentioned above can form different coordination sites for other transition metal cations, thereby affording the potential of tailoring different sequestration resins for selective uptake of different cation impurities in reactor water and other plant streams in the light water reactor facility. In addition, it should be appreciated that use of the polyamines, such as polyallylamines of different molecular weights, will allow tailoring of the equilibrium capacity of the sequestration resin.

In an alternative embodiment, the sulfonamide linkage is replaced with a traditional ionic interaction between the ionized sulfonic acid and a fully quaternary ammonium base functionality, also ionized. The transition metal cation separation is accomplished via the same sequestration interaction with the same ligand base as in the sulfonamide case. However, the coupling to the polymeric resin backbone is no longer covalent, but is governed by the pH of the aqueous solution within the pores of the resin.

At neutral pH, as one would find during typical operation of reactor coolant waters and fuel pool storage waters in the typical light water reactor, the ionic interaction that constitutes the coupling of the ligand to the resin is quite strong and is typically not displaced by the low concentrations of cations in solution. At somewhat lower pH the cobalt ion is removed from the ligand and the coupling is disjoined thereby releasing the amine base ligand into free solution. It should be apparent then that this approach offers a pH dependent mechanism for capture and removal of cobalt cations from the process streams of interest in both the reactor coolant system and the radioactive waste processing systems.

With regard to this invention, we described first a synthesis of a TEPA ligand to a trimethylammoniumchloride coupling functionality. As with the sulfonamide coupling, all of the amine base ligands previously mentioned may also be used. In addition, there are other synthetic approaches to producing multiple quaternary substitutions in place of the trimethyl substitutions described herein. Finally, an additional novelty to this approach specifically involving the epoxide starting material and the TEPA ligand amine base is that the resultant sequestration site for the transition metal cation is fully six-fold coordinated with four lone electron pairs from nitrogen in the plane and one pair each from the terminal amine and the hydroxide residue from the epoxide opening perpendicular to the plane. Cobalt sequestered in this manner should experience little kinetic inhibition and should be bound irreversibly.

Figure 2:
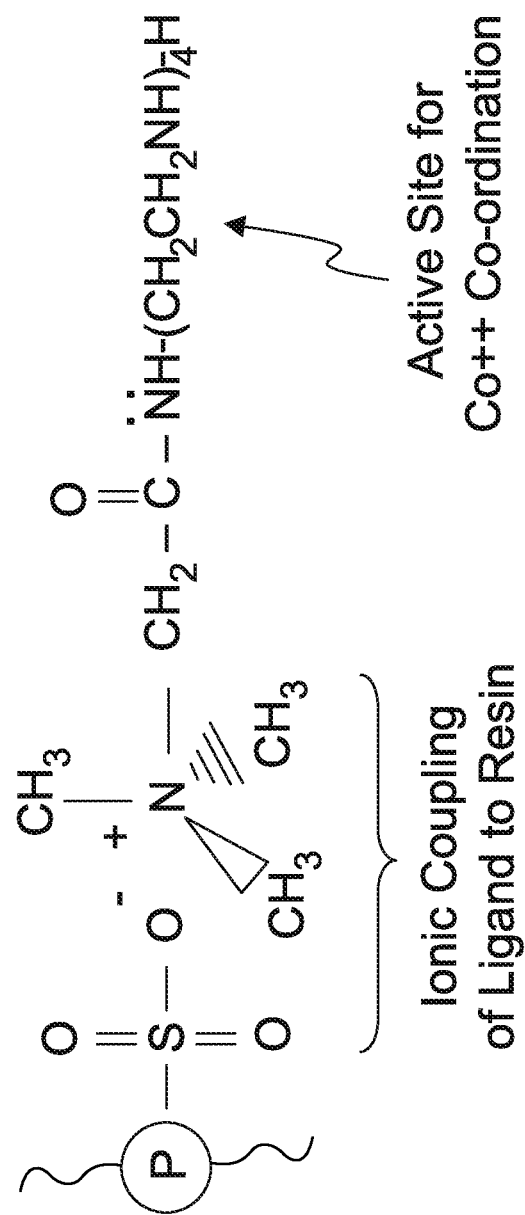
FIG. 2 shows the formula for tetraethylenepentamine (TEPA) based sequestration ligand using "coating solution" approach beginning with betaine hydrochloride. Note that a similar coating solution can be obtained from protonated forms of TEPA itself, that is without the betaine hydrochloride coupling, as shown schematically in FIG. 11 and discussed in the text.

The synthesis of quaternary ammonium compounds coupled to TEPA begins with the commercially available substance, betaine hydrochloride, (carboxyl methyl) trimethyl ammonium hydrochloride, $^+N(CH_3)_3CH_2COOHCl^-$ (see FIG. 2). Betaine hydrochloride can be reacted with various chlorinating agents to produce chlorocarboxymethyl trimethyl ammonium chloride which then can be reacted with tetraethylenepentamine (TEPA) or other amines to form the betaine amide of TEPA as an example $^+N(CH_3)_3CH_2CONH(CH_2CH_2NH)_4HCl^-$.

When an aqueous solution of this compound is passed over a clean and sized sulfonic acid cation exchange resin such as Graver PCH, an electrostatic association between the ionized sulfonate residue and the ionized quaternary ammonium group binds the pendant TEPA ligand on the resin at neutral pH which can therefore function like the sulfonamide covalently coupled resin previously described. An alternative starting material in the coating approach of Graver PCH is to use the sulfonic acid analog of betaine, $^+N(CH_3)_3CH_2SO_3HCl^-$. Activation of the sulfonic acid group by either chlorination or esterification followed by amidation with TEPA or other amines will produce a betaine sulfonamide, $^+N(CH_3)_3CH_2SO_2$—$NH(CH_2CH_2NH)_4HCl^-$. Both carboxylic amides and sulfonamides are stable to hydrolysis at near neutral pH solutions as found in BWR/PWR plants.

The synthesis of betaine carboxyamide of TEPA (see structure above) or other amine amide analogs can be done by (1) reaction of trimethyl amine with methyl or ethyl bromoacetate followed by amidation of the produced trimethyl ammonium betaine ester with TEPA or other amines (2) conversion the carboxylic acid of betaine hydrochloride to an ester by acid catalyzed esterification and, again, amidation with TEPA or other amines. The sulfono analogs can be made by reaction of the bromomethyl sulfonic methyl or ethyl esters with trimethyl amine. The resulting trimethyl ammonium bromomethyl sulfonate ester is amidated with TEPA or any other amine. These synthetic approaches produce small betaine like molecules which can (1) ionically coat to the sulfonic acid group of Graver PCH and (2) have a sequestering ligand for cobalt and other metal ions. See FIG. 2.

The synthetic approach allows these low molecular weight betaine analogs to be purified by chromatography or crystallization so that the "coating solution" is free of non covalent TEPA. It should be pointed out that the presence of free or excess TEPA in either the small molecule synthesis preparation or TEPA covalently linked to PCH can mask the spectrophotometric analysis previously discussed to measure cobalt ion uptake capacity in the final form of the modified PCH resin. Free TEPA complexes with cobalt ion and absorbs light strongly at 310 nm masking the weak absorption of cobalt ion at 510 nm. Removal of the free TEPA on the PCH resin involves a series of washes using water, ethanol, and sodium chloride solution. The low molecular weight coating to eliminate free TEPA has been described.

Figure 3:
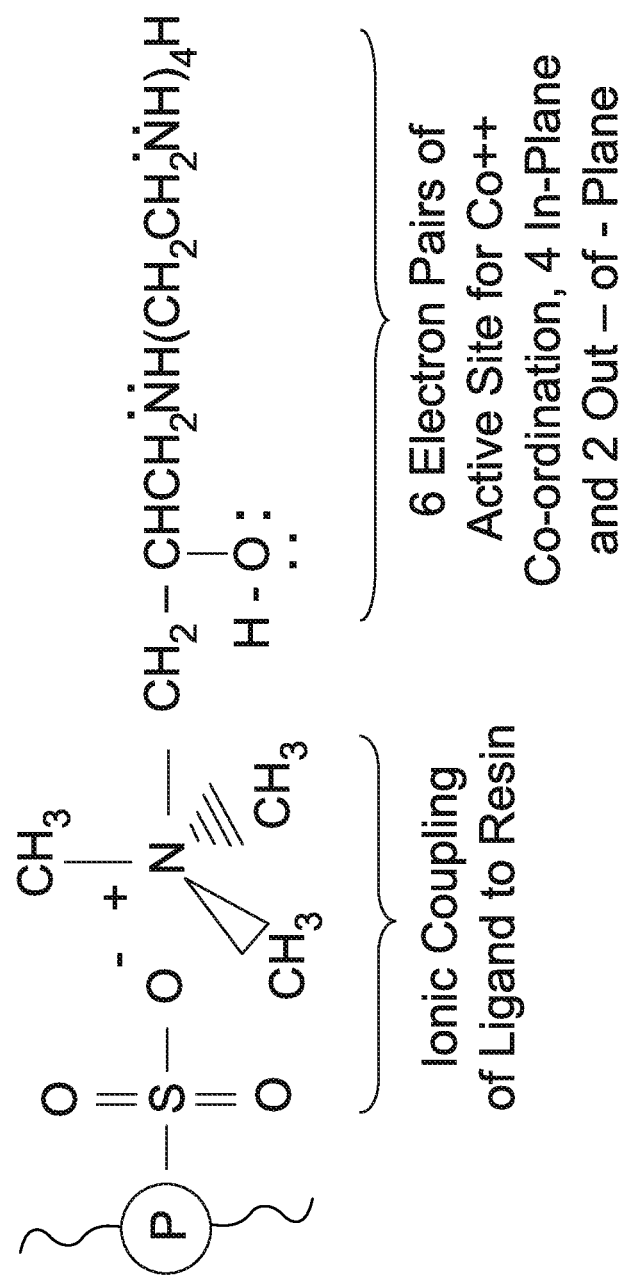
FIG. 3 shows the formula for TEPA based sequestration ligand using "coating solution" approach beginning with non-betaine epoxide. Note that a similar coating solution can be obtained from protonated forms of TEPA itself, as shown schematically in FIG. 11 and discussed in the text.

A new non-betaine small molecule TEPA ligand having a quaternary ammonium group has been developed using a commercially available epoxide (2,3 epoxypropyl) trimethyl ammonium chloride, $CH_2OCHCH_2N^+(CH_3)_3\ Cl^-$ (see FIG. 3). This molecule can undergo epoxide ring opening by the primary amino group of TEPA or any other amine to give 1-N-tetraethylenepentamine 2-hydroxy 3-propyl trimethyl ammonium chloride, $(CH_3)_3N^+CH_2CH(OH)CH_2NH(CH_2CH_2NH)_4\ Cl^-$. This structure has the full six fold coordinated ligand site for metal sequestration, which are five lone electron pairs on the nitrogen and a sterically positioned lone pair on the hydroxyl substituent that completes the coordination sphere of transition metals cations of the approximate size of cobalt ion. See FIG. 3.

Analytic Methods for Measuring Sequestration Capacity

At this point it is worth mentioning several analytical methods that have been developed specifically for assessing the cobalt ion capacity of the sequestration ligand TEPA on the PCH resin backbone coupled via the sulfonamide functionality as just described. First, the product material is amenable to standard elemental analysis for determination of the ratio of sulfur to nitrogen that should provide a quantitative determination of capacity for cobalt capture; although, our experience with ashing and GC/ms of captured vapors has understated true levels of both nitrogen and chlorine in resin sample materials. In addition, a standard ninhydrin test for the presence of nitrogen (that is, purple color) on the resin can be used to determine the success of the synthetic procedure for incorporation of TEPA. Thirdly, the uptake of cobalt from aqueous solution by the inventive sequestration resin can be followed via the pink color caused by cobalt on the resin at residual ion exchange sites, and brown color on pink resin for sequestered cobalt locations, thereby allowing engineering studies of the uniformity of the cobalt front through typical resin precoats in filter demineralizers or through typical resin beds such as those found in the condensate polishing plant of typical nuclear facilities. Fourth, the presence of ionic TEPA, defined as the addition of a proton to a terminal primary nitrogen of TEPA coupled with sequestered cobalt ion can be discerned via its brown color in solution once it is washed from the resin. Fifth, procedures for assessing breakthrough capacity of columns of the sequestration resin have been developed using UV-vis spectrophotometry wherein cobalt ion uptake is tracked using the absorption band at 510 nm and the uptake of cobalt on undesirable, free TEPA is tracked using the broader absorption band at 310 nm. Sixth, intraprocess formation of both the intermediate sulfonyl chloride and final sulfonamide product can be followed by distinct changes in the Fourier transform infrared spectrum of a small sample of resin slurry throughout the synthesis process.

Analytic procedures for determining remnant ionic capacity and total sequestration capacity of the synthetic sulfonamide resin are now described. A column of approximately 250 mg of resin is sluiced into a pipette which is connected to a peristaltic pump delivering approximately 150 ml/hr of 17 mM aqueous solution of cobalt ion. UV-vis spectrophotometry is used to characterize the eluent. Simply speaking, the cobalt ion solution will be pink, the cobalt sequestration complex with TEPA will be brown, and these species are determined by 510 nm and 310 nm peaks, respectively. On the resin, which in powdered form begins a beige or slightly tan color, a deep chocolate colored front will be seen traversing the column top to bottom as the TEPA within the resin sequesters cobalt ion. The background resin will turn pink as the ion exchange sites capture cobalt ion. A measure of ionic capacity can be determined from the cobalt break, and a measure of sequestration capacity can be determined from the amount of cobalt taken up per dry gram of resin by the chocolate colored TEPA complex. Various other colorimetric schemes are developed when ionic TEPA forms sequester cobalt and pass through the resin column.

One unexpected result to describe at this point is that the rate at which the chocolate band traverses the resin column will depend first upon the total sequestration capacity, which is expected, but also upon the flow rate of the cobalt challenged solution. As the flow rate is slowed to the point where delivery of cobalt occurs on a comparable time scale to diffusion of cobalt within the resin pores to and from the sequestration site, the rate at which the chocolate band traverses the resin slows further. In other words, some sequestration sites are inaccessible due to mass transfer resistance within the pore geometry at the specified flow rate of the tests, but become accessible if sufficient time is allowed by slowing the flow rate well below the specified value. It is not unusual to see the test expanding from a number of minutes to a couple of hours up to several hours to several days if all possible sequestration sites are afforded opportunity to bind cobalt ion.

Synthesis of Bead Form Sequestration Resin

Bead form resins are important because most pressurized water reactors in the nuclear power industry and radwaste processing in most all light water reactor power plants use beads in deep bed demineralizers as opposed to using powdered resin in filter demineralizers. The synthesis is the same for both bead form and powder form, and is described below. Among the bead form resins, there are two main bead types used in the industry; gel and macroporous beads. Concerns have been raised over the gel resin versus the macroporous, and the details of each resin type will be described in the following sections.

Problems with pore structure in gel resin beads have been observed, specifically, pore collapse during exposure to solvents of different thermodynamic quality that inhibits transport of amine reagents to the thionyl chloride reaction site. The gel resins are flexible chain polymers without well-formed pores that tend to collapse when going to more hydrophobic solutions typical of those required for the sulfonamide synthesis process for the attachment of the covalently bound sequestration ligands.

As discussed in the prior art, the principle chemistry reactions to produce sequestration sites like those of interest in this patent are done beginning with a gel copolymer of styrene and divinyl benzene. This material is hydrophobic and the sulfonic acid precursor sites are added by surface reaction only. In fact, reaction directly with chlorosulphonic acid at low temperature will functionalize every surface benzene ring with a chlorosulfonate group that then can be reacted directly with an amine like TEPA, again at low temperature, to near completion very quickly.

This behavior is in contrast to our approach that requires the use of nuclear-grade sulfonic acid cation exchange resins as starting materials, either in bead or powdered form. Recall that the physical pore structure limits access to the interior sulfonate sites as well as provides diffusion resistance to transport of reactants like TEPA and products like hydrochloric acid. Therefore, in the pore geometries as opposed to on the free surface, the reactions do not take place to completion, can be driven at higher temperatures for longer times, and must facilitate removal of small molecule products like HCl in order to improve conversion to the desired sulfonamide. For example, elemental analyses suggest that at most a third to a half of the chemical sulfonic acid sites within the bead resin pores are in fact converted in the synthesis to the sulfonamide as compared to the prior art wherein the surface reactions reach complete conversion very quickly.

Tests were performed with the gel bead resin for tetraethylenepentamine (TEPA) and other amines that resulted in functionalization of only surface sulfonic acid groups. For example, tests with both amines that are structurally linear or branched were attempted. In the first case, ethylamino compounds of both lower and higher molecular weight than TEPA were attempted and results indicated smaller values both in terms of chemical conversion to sulfonamides as determined by capacity for cobalt ion sequestration. In the second case, synthesis of a sulfonamide beginning with a gel resin containing surface active and interstitial sulfonic acid groups reacted with tris (ethylamino)amine (TEAA) at one of the primary amine groups producing a claw-like sequestration site. Tests on this resin showed that neither surface-active ligands nor interstitial ligands sequestered significant amounts of cobalt. Very few surface active ligands exist for the case of a gel resin structure and the interstitial ligands are shielded from cobalt analyte by high mass transfer resistance due both to limited pore space and high pore tortuosity.

The interstitial results were confirmed by crushing the beads, mixing the solutions again and obtaining larger conversions and larger cobalt uptake capacity. These observations are unexpected results of the structural impacts of the polymer pore geometry and are not seen in the literature/prior art that typically describes surface reactions only.

Macroreticular or macroporous resin beads are physically distinct from gel-like resins in that they consist of two physically contiguous pore regions. The central core of a macroporous bead typically is constructed of tightly knit, entangled polymeric chains that form an approximately non-porous region. In this core region, there are few ion exchange functional groups. The core is surrounded by a region consisting of less flexible, more rod-like polymer chains that aggregate to form approximately rigid pore walls. In this so-called macroporous region, the pore structure remains intact as the pore walls are functionalized with ion exchange sites such as sulfonic acid cation exchange sites. It is these cation exchange groups that are further reacted as described in this application with various multi-amines through thionyl chloride intermediates to form inductive electron donating structures that attract and bind transition metals like cobalt. This binding occurs at roughly five orders of magnitude greater energy than can be achieved by simple ion exchange, based upon the literature value for the binding energy of cobalt to TEPA in solution. These sulfonic ligands form the bead sequestration sites in completely analogous chemical manner as in the powdered sequestration resin.

The pore structure of macroporous bead resins is physically stable to solvent quality changes, thereby allowing mass transfer of reactants and products to and from the thionyl chloride reaction sites without pore collapse as solvents are cycled between hydrophilic and hydrophobic. The need to use such a macroporous bead structure to produce the bead form sequestration resin synthesis is an unexpected result of this work.

Regarding the colorimetric analytic methods to develop both sequestration ligand capacity and residual ion exchange capacity of powdered form sequestration resin using TEPA, both gel and macroporous beads are darker in color compared to the powder resin. Therefore, those analytic tests are harder to confirm by color. However, where the color is difficult to determine, the UV-vis spectrum will still detect the peaks used for confirmation of sequestration, for example, of cobalt bound to TEPA.

Both carboxylic acid- and sulfonic acid-based cation exchange resins were used as the macroporous substrate for creation of the sequestration site. These macroporous cation exchange bead resins are commercially available, are typically supplied in the hydrogen exchange site form, tend to be several hundred microns in diameter, and can be functionalized to the acid chloride intermediate using the same fundamental chemistry described for the synthesis of powdered form sequestration resins described herein. Sequestration ligands formed from linear multiamines like TEPA, branched multiamines like TEAA, and lower molecular weight polymeric amines such as polyallylamine have been studied for cobalt ion uptake. Both whole bead and crushed bead samples of these macroporous sequestration resins were studied to examine cobalt uptake capacity at surface and interstitial sequestration sites, respectively.

Like the gel resin bead cases described above, there are unexpected mass transfer resistances to the synthesis and to the cobalt uptake for the branched and polymeric multiamine ligands even when using highly porous macroreticular matrix structures for the bead. For the linear case, however, sequestration ligands formed within the macroporous region of the resin matrix exhibited significantly higher cobalt ion uptake capacity than the equivalent ion exchange resin itself. This result was seen in general for carboxylic acid- (weak acid) and sulfonic acid- (strong acid) based cation exchange sites. Since strong acid cation exchange resins typically dominate the nuclear power industry in both bead and powder form for purification of operating reactor coolant streams and for cleanup of radioactive waste process streams, this application focuses on the sulfonic acid cation exchange macroporous resins. In the following sections, synthesis of bead-form sequestration resins for use in deep bed demineralizers are described.

A synthesis was carried out on a commercially available macroporous cation exchange resin, Purolite NRW 1600, that is used for cation exchange in deep-bed demineralizers for water purification processes in commercial nuclear power plants. The characteristics of this macroporous bead resin include 2.1 equivalents per liter (eq/l) total capacity, 43% to 48% interstitial moisture retention, 570±50 µm mean diameter. This resin is used in a nuclear power plant where regeneration is not required. It is a high capacity resin with high selectivity for cesium, sodium, and cobalt, and the kinetics of ion exchange for this resin are good with high loading capacity. The synthesis of sulfonamide sequestration sites and observations for this bead resin consist of the following steps that are derived from knowledge of the same synthesis beginning with powdered form cation exchange resin as described herein:

1. The bead resin (H form) dried at 50° C. under a vacuum for 24 hours. 40% water by weight of the resin was removed. Azeotropic distillation of the resin in toluene showed that final removal of the water was difficult in this macroporous resin. The oven dry resin sticks easily to glass, the dry resin is a purple black color and unaffected in any color change by acid, base or organic solvent.

2. The dry beads stick to the glass wall in toluene and become suspended when thionyl chloride is added, which enters the macroporous interstitial volume. This chlorination step forms the thionyl chloride intermediate required for the sulfonamide synthesis. The dry resin (NRW 1600 sulfonyl chloride) is a purple colored resin. It is accomplished in the same manner as the powder form sequestration resin with the additional observation that the reaction temperature can be raised to as high as 80° C. in order to help increase the final conversion. This unexpected result, namely the ability to raise temperature quite high without damaging the final product, is a consequence of the fact that mass transfer resistance to reactants reaching the sulfonated polystyrene resin backbone is much greater within the resin pores than in the case of the free surface reaction described at much lower temperatures.

While the prior art suggests performing the chlorination reaction to convert sulfonic acid to chlorosulfonic acid using thionyl chloride in toluene at 0 to −5° C., we find that once the interstitial water within the resin pores has been removed via toluene azeotropy the chlorination temperature can be increased to 80° C. Even at this temperature for nearly 24 hours, while refluxing the toluene solvent, the reaction does not go to completion because of mass transfer resistances. We find from elemental analysis that typically only half of the available sulfonic acid sites are chlorinated. Nonetheless, this is sufficient to produce a deep purple color to the resin and will result in sufficient amidation in the subsequent addition of the multiamine, such as TEPA.

The prior art also suggests that the surface chlorination can be achieved with stoichiometric addition of thionyl chloride, the reaction in the resin pores is successful with significant excess of thionyl chloride, up to 2.25 times theoretical stoichiometry.

The integrity of the pore geometry during removal of interstitial water is not an issue in the prior art reactions that are accomplished at the polymer surface. In the present case, as well as for bead resin, removal of interstitial water by physical drying tends to cause pore collapse resulting in poor conversion of internal sulfonic acid groups to chlorosulfonate. Instead, physical replacement of interstitial water by toluene during azeotropic distillation accomplishes water removal without pore collapse and therefore facilitates subsequent reactions that would normally be mass transfer limited.

3. The amidation step to convert the chlorinated intermediate to the sulfonamide sequestration resin was done according to the procedures described herein for powder form, except that the reaction time and temperature can be significantly extended (for example, to 24 hours and 60° C.) due to the need to overcome unexpected diffusion resistance compared to the conventional surface active reaction pathway. The resin also clumped together, but the bead clumps were separated by increased stirring and the addition of dimethyl formamide, both of which are not required in the powdered resin synthesis. The filtered beads were finally water and methanol rinsed.

For reasons analogous to the chlorination, the amidation reaction to create the sulfonamide from chlorosulfonic acid and TEPA is accomplished at much higher temperatures and longer times within the pore geometry than prior art would suggest based on surface reaction experience. In the present case, the amidation temperature is kept as high as 65° C. for as long as 24 hours.

Again, as with the concentration of reactants in the chlorination step, the TEPA concentration in the amidation step can significantly exceed theoretical stoichiometry by as much as a factor of 1.5 to 10.

4. Testing the beads with ninhydrin showed purple beads confirming incorporation of the nitrogen from the amine. Beads challenged with aqueous cobalt ion solution (typically 17 millimolar cobalt chloride in this study) showed a brown color characterized by absorbance at 310 nm that is indicative of sequestration of cobalt.

Assessment of Powdered Sequestration Resin for Radiocobalt Cleanup

As discussed, the cleanup of ionic species such as cobalt and nickel in nuclear power plant aqueous streams is important to reduce personnel dose. The methodology of the present invention is developed for the sequestration of select ions (like cobalt and nickel) specifically in the presence of other transition metal ions (such as iron, nickel, zinc, etc.). This resin may also be used in any light water nuclear power plant for the removal of activated cobalt, and other similar species.

Assessment 1

In order to assure a uniform precoat of the sequestration resins onto plant septa, it is necessary to floc the sequestration resin with standard anion exchange resin. The remaining cation capacity of the sequestration resin serves both to achieve adequate floccing and remove cobalt; therefore, it is necessary to determine the optimized amount of anion resin to mix with the sequestration resin. The media was mixed with anion resin then observed for optimum floccing characteristics. The amount of anion resin used in the initial testing with the sequestration resin was 5%, 10%, 20% and 50%. The second set of sequestration resin tests used much less anion resin, from 1% to 10%. This is because the cationic capacity of the sequestration resin is much less than standard cation exchange resin.

For the first set of tests ranging in anion resin concentration from 5% to 20% for floc capabilities only a 5 minute relative volume reduction was used as only one of the samples showed a decent floc with clear supernate. Only 5% standard anion resin ratio produced the supernate clarity and decent agglomerated floc.

A second set of tests were completed with reduced levels of standard anion resin added, 1%, 2%, 5% and 10% levels. These lower values are likely related to the reduced sulfonic acid cation capacity of the sequestration resin because the ligand portion should not interact with anion resin.

Both the 5% and 10% standard anion resin ratio samples showed the best results for settling volumes and supernatant liquid quality.

Assessment 2

Following the tests for optimum floccing characteristics, the mixtures were evaluated for cobalt sequestering capacity to be sure no deterioration in capabilities would be presented by the presence of the anion resin.

The test samples for 2%, 5%, 10%, 20% and 50% anion loading were evaluated for elemental cobalt sequestering capacity.

Figure 4:
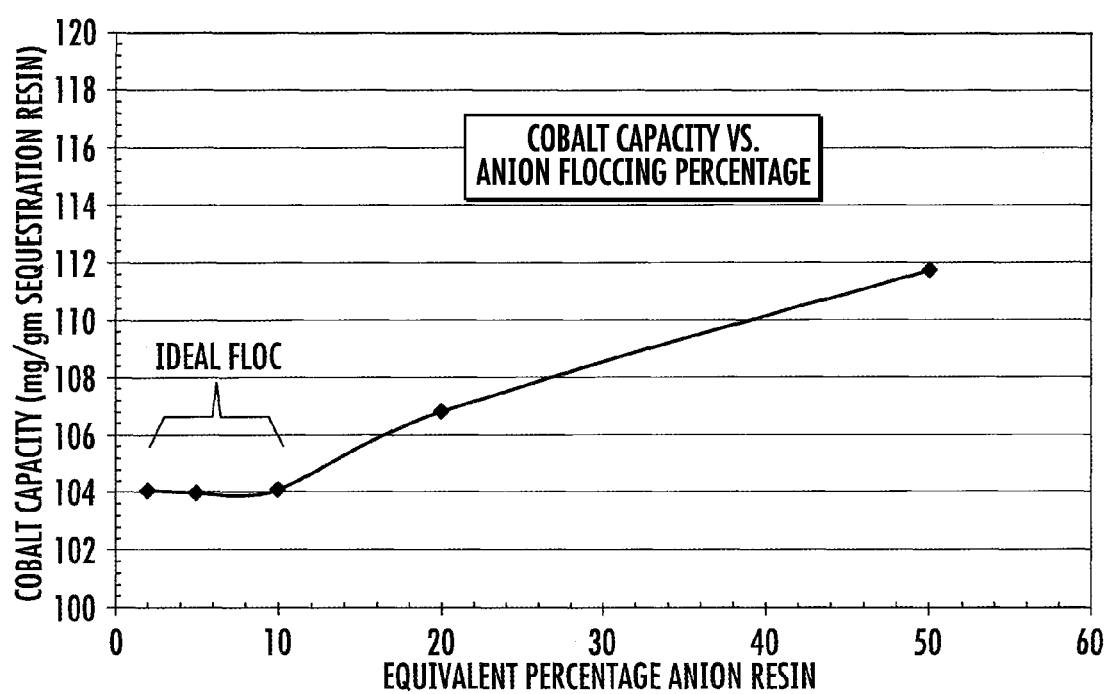
FIG. 4 shows cobalt capacity v. anion floccing percentage. The ideal floc will be formed with the fraction of anion resin which least affects sequestration capacity.

The samples were filtered, rinsed with demineralized water, ethanol and dried in a low temperature vacuum oven. The specific capacity data, mg Co/gm sequestration resin, is shown in FIG. 4. As shown, there is no change or reduction in cobalt capacity in the range of slurries determined to be optimal for application in an actual plant systems.

It is clear that once flocced with the optimum amount of anion resin, the sequestration resin can be used as an overlay or as a mixture with other preflocced precoats.

Figure 7:
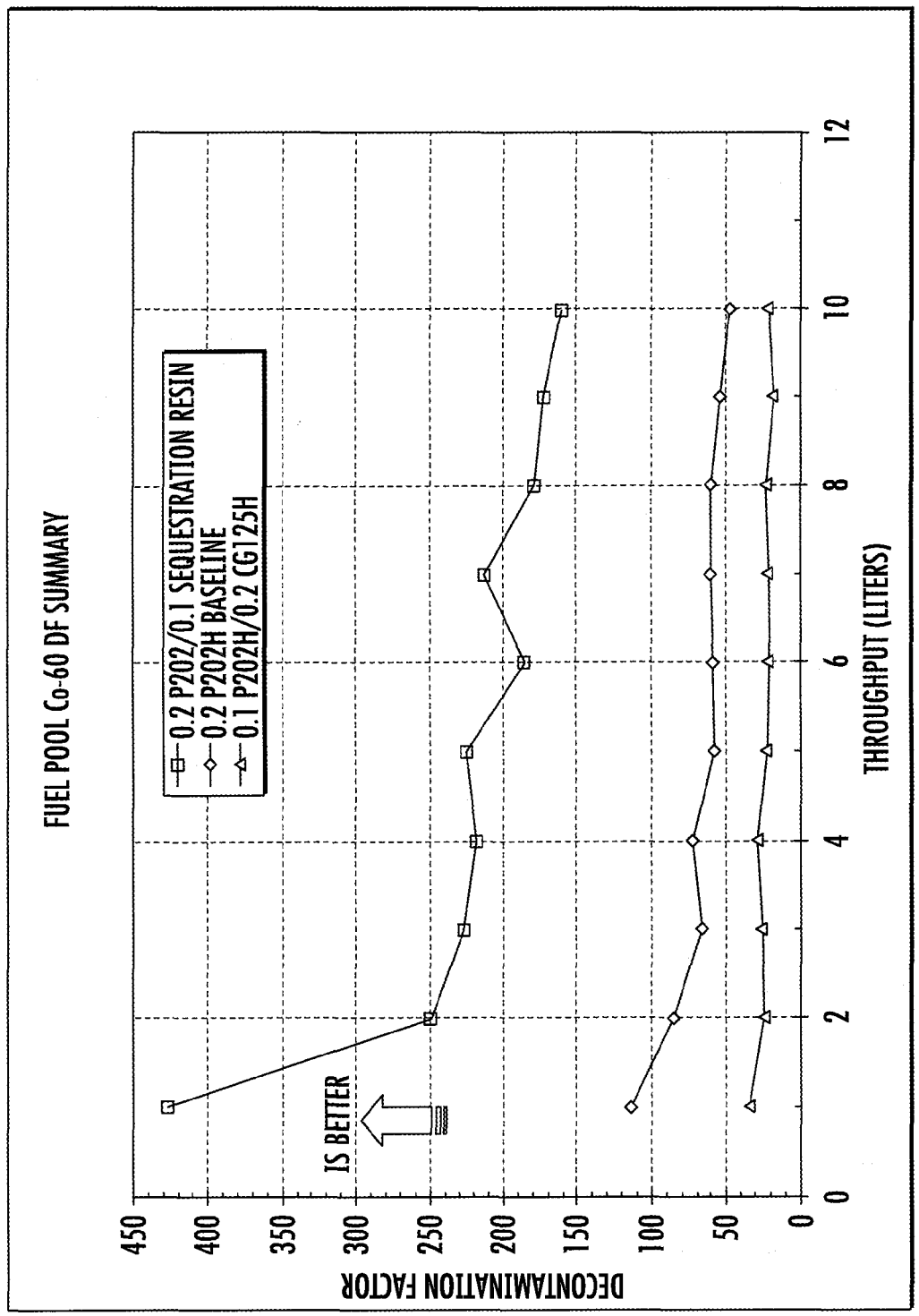
FIG. 7 shows results of testing of the resins for removal efficiency of cobalt from a nuclear plant's fuel pool water sample relative to traditional ion exchange resins. The inventive resin material, synthesized in the laboratory at bench scale, overlaying traditional ion exchange resin (open square symbol) showed a ~3 fold improvement in cobalt decontamination factor relative to both baseline ion exchange resin with a cation exchange overlay (open triangle symbol), and relative to baseline ion exchange resin alone but at twice the underlay loading (open diamond symbol)
Figure 8:
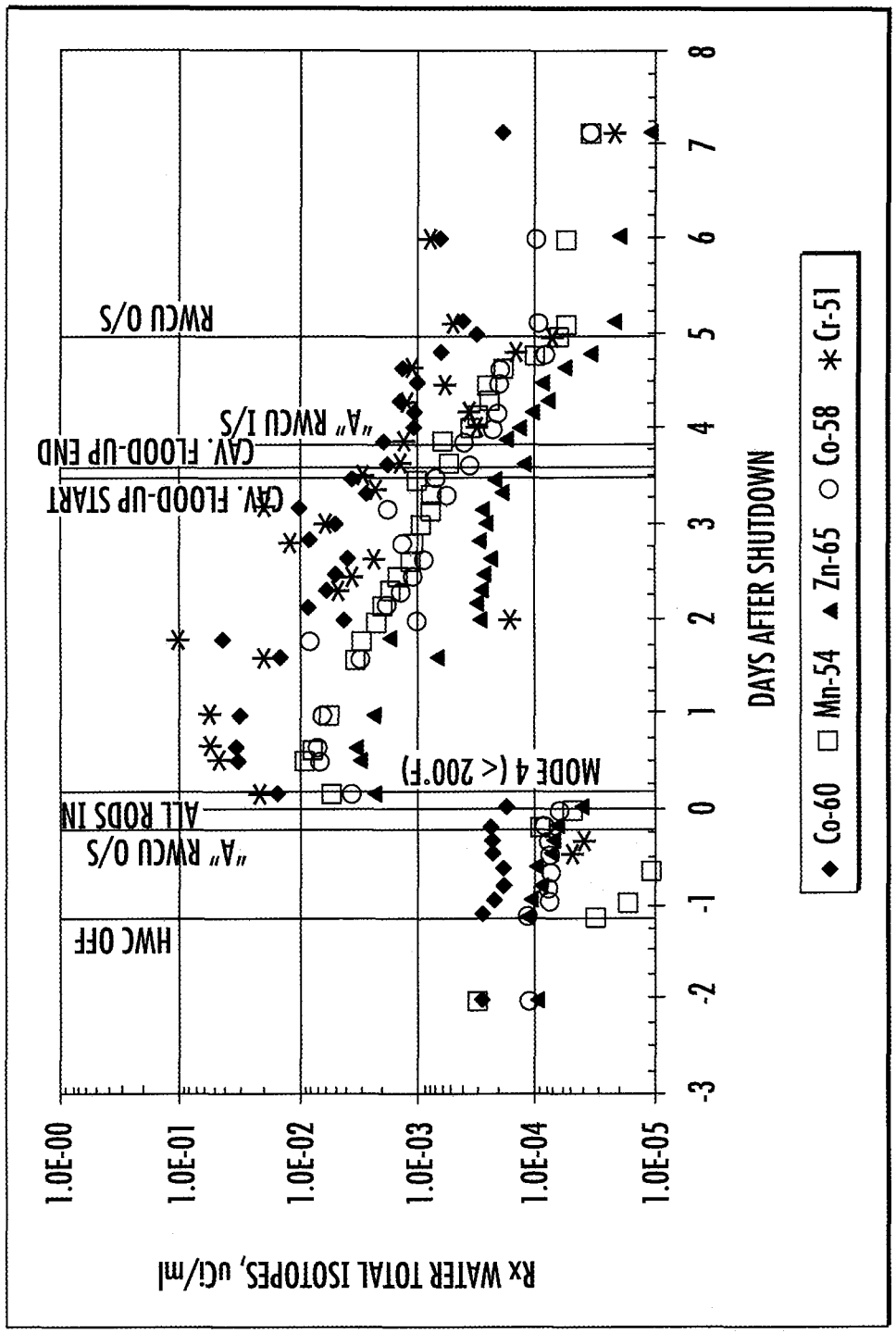
FIG. 8 shows typical activity release in reactor water at a typical boiling water reactor nuclear power plant during shutdown from full power operation to refueling condition.

The inventive sequestration resin provides a much more rapid and higher capacity activity cleanup, as shown in FIGS. 5 to 7 where the resin material showed a ~3 fold improvement in cobalt removal efficiency, of primary coolant cations (including $^{58}Co$ and $^{60}Co$) thus affording reduced critical path downtime in outages and other plant transients. External core dose rates are also reduced, thus resulting in reduced overall radiation exposure at nuclear plants. The reduction of specific elemental species from reactor feedwater to eliminate $^{60}Co$ and $^{58}Co$ production has large implications in the industry, since $^{60}Co$ and $^{58}Co$ are the predominate radionuclides responsible for the majority of shutdown radiation dose in BWRs and PWRs. Specifically, current state-of-the-art cobalt removal methods require several days following shutdown to reduce activity levels to a safe level, thus becoming limiting factors impacting outage schedules (critical path). FIG. 8 shows the typical activity release at a plant during shutdown.

EXAMPLE 1

Several test runs with overlays of PCH-based, sulfonamide cobalt sequestration resin ("sequestration resin") were completed using nuclear plant reactor water containing radio cobalt $^{60}Co$. As baselines for what is currently used in the plant, sequestration resin performance was compared to two commercial powdered resin-fiber mix precoat configurations: the plant's standard 67% resin 33% fiber mix, Ecodex P202H (hereinafter P202H) as an underlay media in conjunction with their standard resin overlay and the plant standard 90% resin, 10% fiber mix, Ecodex P205H (hereinafter P205H). The testing of the sequestration resin was completed with a third precoat combination using the material as an overlay, then mixed in with P202H or as a fifth option using the material mix as a pre-flocced entity forming a single layer precoat.

Figure 9:
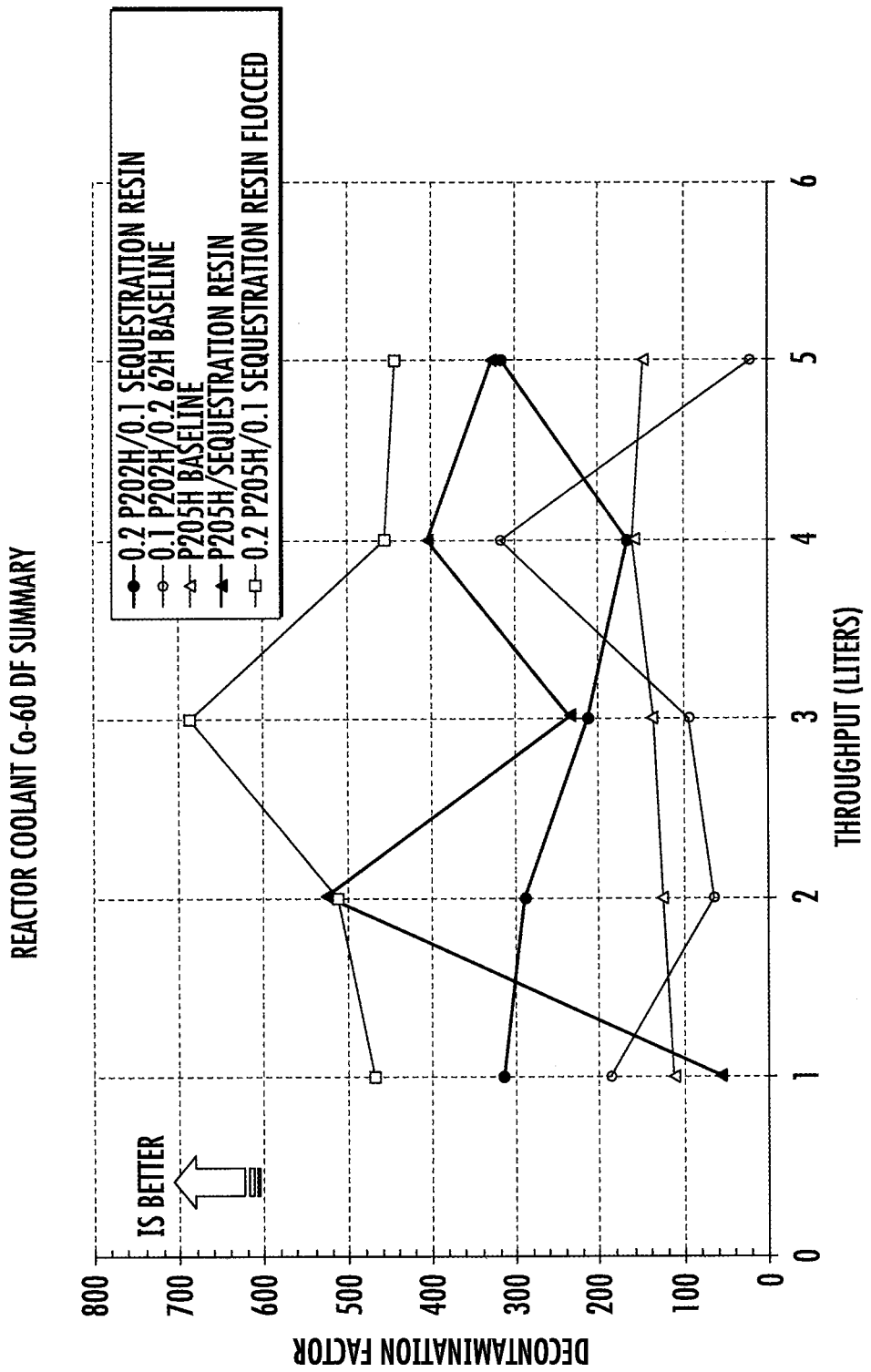
FIG. 9 shows testing of nuclear plant reactor coolant $^{60}Co$ decontamination factor summary. The data on sequestration resin synthesized at laboratory scale (from FIG. 5) are compared to the same resin flocced with an ideal amount of anion exchange resin (from FIG. 4) and then tested as an overlay to traditional ion exchange resin (open square symbol)

Decontamination of the reactor water stream by removal of radiocobalt $^{60}Co$ was detected by counting effluent water samples. As shown in FIG. 9, the pre-flocced sequestration resin overlay provided the best $^{60}Co$ removal performance of any precoat combination. This is likely because the sequestration resin media was uniformly distributed in the overlay and stationary as flow impinged upon it. The majority of the analysis had no $^{60}Co$ detectable in the effluent and the Minimum Detachable $^{60}$Co Activity (MDA) levels were used to calculate the $^{60}$Co Decontamination Factor (DF).

The next best performing precoat combination was P205H with the sequestration resin mixture as an overlay. The third best performance was using P202H as an underlay and the sequestration resin mixture as an overlay. These results are consistent with the amount of capacity in the underlay material.

These DF data provide evidence supporting the claim that cobalt sequestration resins demonstrate higher uptake capacity and better precoat performance than commercially available ion exchange powdered resins qualified for use with reactor water in the nuclear power industry.

Although not the main objective of these tests, other radionuclides such as $^{54}$Mn, $^{58}$Co, and $^{65}$Zn were also quantitatively removed by the precoat tests using P205H as an underlay and the sequestration resin as an overlay.

EXAMPLE 2

Tests were also completed using nuclear plant spent fuel pool water containing $^{60}$Co. Similar to the reactor water testing, the sequestration resin was tested as an overlay at 0.1 dry lbs/ft$^2$ over a 0.1 dry lb./ft$^2$ base precoat of P202H and compared to the baseline performance of P202H alone currently used for spent fuel pool cleanup at the nuclear power plant. The results of this test are summarized in FIG. 7. In general the sequestration resin overlay increased the DF by a factor of 2 to 4 throughout the entire test period.

Even though the tests using the sequestration resin as an overlay were promising at up to five liters throughput, it was necessary to determine higher throughput performance. Ideally, these tests would run until the $^{60}$Co removal efficiency decreased so that an operational capacity for the media could be determined.

Figure 10:
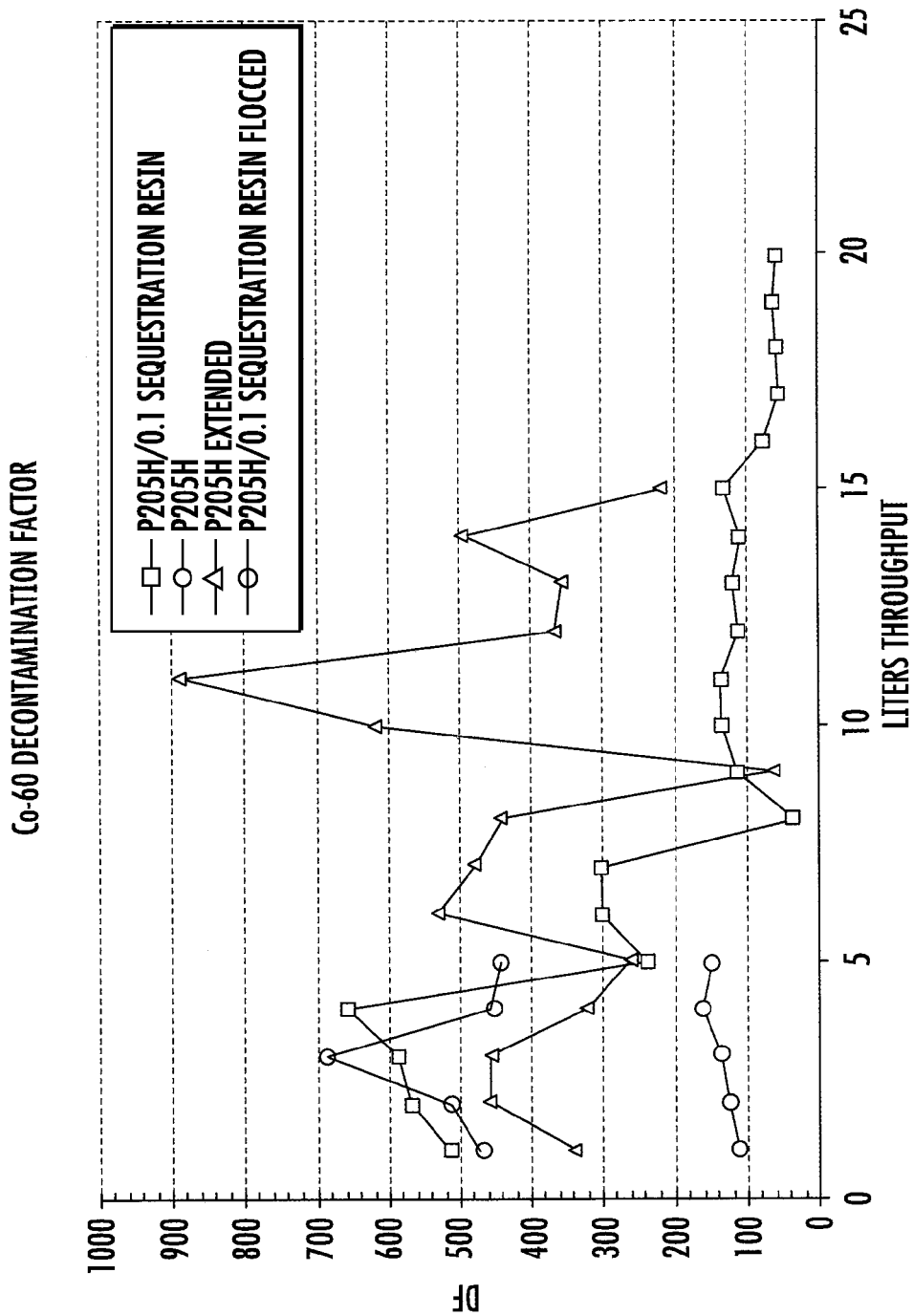
FIG. 10 shows extended testing of nuclear plant reactor coolant $^{60}Co$ decontamination factor. The tests from FIG. 6 are extended with larger volumes of actual reactor coolant sample challenging the resin.

FIG. 10 compares extended throughput runs for the baseline, P205H and a flocced sequestration resin overlay. The figure includes the pre-flocced sequestration resin overlay data from FIG. 9 for comparison.

The sequestration resin overlay precoats clearly outperform the baseline P205H in the first five liters processed. The extended P205H run performance late in the run is difficult to explain and was not repeatable.

Comparison of Performance of Lab Scale and Scaled Up Powdered Resin

Figure 13:
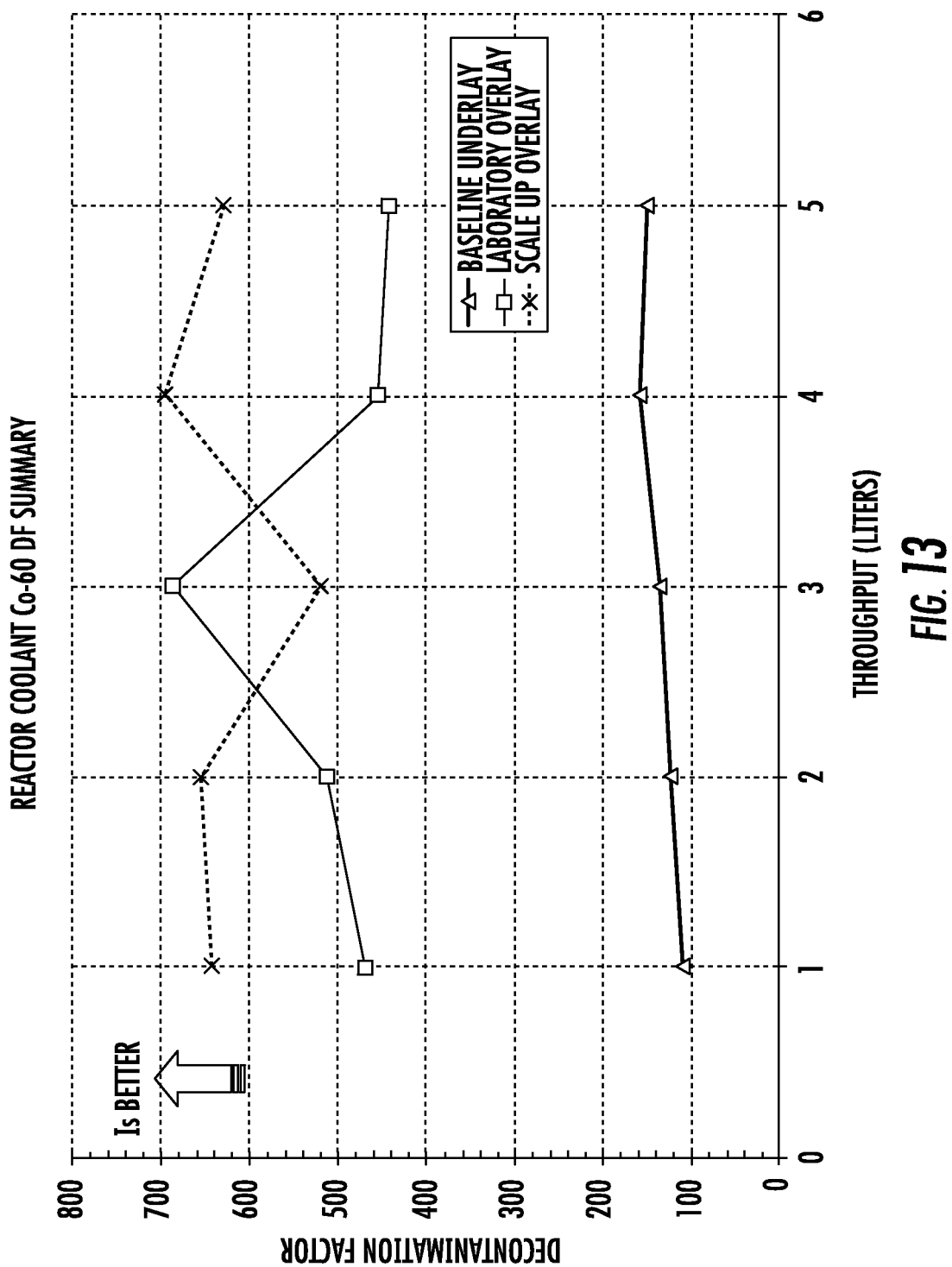
FIG. 13 shows the sequestration resin decontamination of $^{60}$Co using laboratory and scale up resin product.

Samples of the inventive sequestration resin at the laboratory scale and at a synthesizer capable of multiple kilogram batch sizes were compared for their $^{60}$Co decontamination performance at a commercial boiling water reactor nuclear power plant. Several liters of actual reactor water passed through three example powdered resin precoats in a pilot filter demineralizer skid capable of measuring $^{60}$Co activity via gamma scan at the inlet and exit of the skid. The precoats tested were an underlay of a commercial powdered resin mixed ion exchange precoat which served as the baseline test, an overlay of the sequestration resin flocced with a small amount of anion resin onto that precoat that had been synthesized using the laboratory scale methodology described in the original body of this patent application, and an overlay of flocced inventive sequestration resin produced by the scale-up vendor. The results are shown in FIG. 13 where both samples of the sequestration resin performed equivalently and both substantially exceeded the baseline decontamination factor of the underlay. These data provide clear evidence of successful reduction to practice of the synthesis technology described in this application.

By providing an increase in activity removal, the present invention would reduce critical path impacts and allow for shorter outages resulting in lower power replacement costs, as well as, optimized workload planning for outage and maintenance workers. Worker dose would also be reduced as well as radwaste generation and eventual disposal costs.

The present invention provides a (1) reduction of critical path time during outages and other non-power-producing transients, thus improving nuclear plant capacity factor, (2) reduction in worker dose exposure, and (3) reduction in site activity goals by overcoming the challenges of reactor water activity cleanup which is limited by equilibrium capacity and uptake kinetics of current ion exchange resins used throughout the industry.

Deligation Chemistry for Powder Form Sequestration Resin

This section describes deligation chemistry for powder form sequestration resins, specifically TEPA sequestration sites synthesized from sulfonic acid groups on Graver PCH nuclear grade powder resin. Similar results are obtained using bead form resin synthesized with TEPA amine and macroporous sulfonic acid cation exchange resin beads as described above. The full range of tests were limited to powdered resin, but it is expected that the same ligation and deligation chemistry will be seen with beads in typical radwaste applications.

Recall that it is possible to achieve sequestration ligand sites on the sulfonic acid cation exchange resin by employing ionically coupled sequestration sites. In this application, we describe the addition of multiamine ligands to cation exchange handles which themselves coat onto the sulfonic acid resin when the handle forms the conjugate cation to the SO$^-_3$. The current invention involves applying this concept without the need for a handle. In this case the TEPA itself is protonated stoichiometrically using known quantities of strong base added to commercially available, analytic grade TEPA pentahydrochloride. By analogy, similar coating amines can be synthesized from other independently available multi-hydrochlorides, for example PEHA hexahydrochloride.

Several different sites are available for functionalization on powdered sulfonic acid cation exchange resins. The model system used in this study was PCH resin treated with a solutions of TEPA, either in the neutral form, the monovalent form (TEPAH$^+$), the divalent form (TEPAH$^{2+}$), and the trivalent form (TEPAH$^{3+}$). In general, neutral TEPA in water is basic with room temperature pH of approximately 11. It can be removed from PCH by washing with organic solvents like ethanol. The monovalent cation can be removed from PCH by ion exchange with typical divalent transition metal cations like cobalt or zinc. The divalent and trivalent forms of TEPA are coating agents that can serve as sequestration sites for cobalt ion while also staying bound to the resin at the sulfonic acid cation exchange site within PCH.

This section describes how these different PCH-TEPA sites are formed and their response to cobalt ions ($^{60}$Co ion is an example of a contaminant typically found in nuclear plant radwaste streams) along with observations obtained in the laboratory.

1. The first type of site created consists of the covalent sulfonamide (sequestration form) sites on the resin. When cobalt is introduced to this site, the resin turns brown, but the eluent would be pink. These colors are indicative of free cobalt or cobalt bound to the sequestration ligand. The pink color is indicative of hydrated cobalt and is verified by an absorbance peak at 510 nm by UV-vis spectroscopy. The brown color indicates the cobalt has been sequestered and can be verified by absorbance at 310 nm by UV-vis spectroscopy.

2. Second, TEPAH$^+$ conjugate sites can be created on the resin. The TEPAH$^+$ cation is created by starting with TEPA base and treated with one molar equivalent HCl, and protonation of a primary nitrogen on the TEPA. This resin can then be washed with saturated brine to displace the TEPAH$^+$. Therefore, if the TEPAH$^+$ form is introduced to divalent cobalt, it will be displaced. These conclusions were observed in the laboratory by the following process: as cobalt ions are introduced they bind to the sequestration ligand, observed by color change (brown) and confirmed by UV-vis spectroscopy. As cobalt is introduced, the brown color is eluted from the bottom of the column and the resin turns pink in color; indicative of conventional ion exchange. The TEPAH$^+$ cation first sequesters cobalt and then is displaced by ionic exchange at the sulfonic acid sites on PCH. Therefore, in any application involving radioisotopes of cobalt, the TEPAH$^+$ must be removed from the resin if it is desired to hold the cobalt during operation and subsequent processing.

3. Thirdly, TEPAH$^{2+}$ can be created on the resin. The TEPAH$^{2+}$ cation is generated by dissolving commercial TEPA pentahydrochloride (372 mg, 1 mmole) in deionized water (25 ml of water, pH 1 to 2). Strong base (3 mmoles NaOH) is added and mixed resulting in a solution with a pH of 9 to 10. Washing sulfonic acid cation exchange resin like PCH with this solution will result in exchange sites conjugated by TEPAH$^{2+}$. When cobalt is introduced to this material, it is sequestered by the TEPAH$^{2+}$ and the resin turns brown in color, indicating the high strength of the sequestration bond available from the three remaining nitrogen electron pairs. The eluent, however, does not turn brown if the pH remains neutral; therefore the TEPAH$^{2+}$ with conjugated cobalt ion remains ionically bound to the resin. This is an unexpected result due to the fact that Co$^{2+}$ would not displace a like-charged TEPAH$^{2+}$. If this TEPAH$^{2+}$ cation conjugated resin is challenged with Zn$^{2+}$ at neutral pH, it is observed that the Zn$^{2+}$ does not displace TEPAH$^{2+}$. A similar result is concluded from challenging the same resin with both Zn$^{2+}$ and Co$^{2+}$, wherein the typical commercial nuclear power reactor coolant will contain much higher levels of zinc ion than cobalt ion. Cobalt ion will first be sequestered by the TEPAH$^{2+}$ and as Zn$^{2+}$ is introduced, it does not displace the TEPAH$^{2+}$ conjugate cation from the resin. If the sequestration site were covalently bound, as the sulfonamide, then it is clear that cobalt ion is taken up in that site irreversibly at neutral pH even in the presence of a zinc ion challenge. These results are not expected if the resin were simply an ion exchange resin, where some equilibrium of Zn$^{2+}$ and Co$^{2+}$ would be present at the ion exchange site on the resin.

4. A fourth type of site created in a model study of ion exchange is the TEPAH$^{3+}$ conjugate of the sulfonic acid on the resin. The TEPAH$^{3+}$ is created by dissolving commercial TEPA pentahydrochloride (372 mg, 1 mmole) in deionized water (25 ml, pH 1 to 2). Strong base (2 mmoles NaOH) is added and mixed resulting in a solution with a pH of 7, consisting of a TEPAH$^{3+}$ cation that still contains two lone pairs of electrons remaining on the two unprotonated nitrogen. The two nitrogens left uncharged still sequester the cobalt ion. Divalent cobalt will not displace the TEPAH$^{3+}$ from the sulfonic acid exchange sites on the resin. Similar to the TEPAH$^{2+}$, the resin turns a dark chocolate brown, which is indicative of the cobalt being sequestered. If the cobalt displaced TEPAH$^{3+}$ from the cation exchange site, the resin would be pink.

Introduction of zinc ion in a manner analogous to the TEPAH$^{2+}$ model system yields identical results in the TEPAH$^{3+}$ case. This result demonstrates that TEPA is of high enough molecular weight to serve both as an ionic coating agent and a sequestration site when in the divalent or trivalent form. Additionally, the result that cobalt ion is first sequestered by TEPA before displacing TEPAH$^{2+}$ from the cation exchange site of the resin is unexpected given the need to protonate some of the nitrogen on the TEPA ligand in order to induce it to ionically coat the resin. Furthermore, the fact that only two unprotonated nitrogen are required to sequester cobalt ion by the TEPAH$^{3+}$ conjugate site is an unexpected result, especially in the presence of significantly higher concentration of zinc ion than cobalt ion.

5. An additional experiment was performed to examine the ion exchange selectivity of cobalt ion over TEPAH$^+$ for typical sulfonic acid cation exchange resin. A mixture of PCH resin exposed to cobalt ion in aqueous solution with resin that had been placed in the TEPAH$^+$ conjugate form were heated and stirred. The supernate solution turned brown in color, confirmed by absorbance at 310 nm for the cobalt-TEPA sequestration complex. There appears to be a dynamic exchange between the sulfonic acid cation exchange site and the TEPAH$^+$ conjugated site wherein the TEPA captures the cobalt ion. Therefore, if cobalt ion binds to an exchange site, any available TEPAH$^+$ conjugate will attract the cobalt ion into the sequestration site even though it is like-charged. This is clearly an unexpected result. The reason the supernate turns brown is that the divalent cobalt displaces the monovalent TEPAH$^+$ even though it is bound with sequestered cobalt. It is clear that such behavior is also unexpected based simply upon ion exchange dynamics.

Thus, for radwaste system application, the ionic exchange sites can become the dynamic control for transient $^{60}$Co uptake while the sequestration sites become the long-term control. For example, in a deep bed demineralizer the ion exchange mixed bed may be overlaid with sequestration resin beads, or vice versa. As sequestration sites become available, ion exchange sites will be liberated by transport of the analyte to the long-term site.

The main embodiment of the powdered resin synthesis employed the multiamine tetraethylpentaamine (TEPA). Recall that four of the five lone electron pairs in TEPA form the sequestration ligand for uptake of transition metal cations like cobalt ion when the TEPA is covalently bound to the sulfonic acid cation exchange sites of the resin backbone as a sulfonamide. Alternatively, the sequestration ligand can be ionically coated onto the resin as a cation form itself. In the case of TEPA, three possible cation conjugates that still maintained sequestration uptake capacity were studied: TEPAH$^+$, TEPAH$^{2+}$, and TEPAH$^{3+}$, meaning the mono-, diand tri-protonated forms of TEPA. Finally, the neutral form of the multiamine can also physisorb to the resin backbone; however, in this form it is usually not strongly enough bound to serve as a sequestration ligand. Therefore, the neutral form of TEPA in the model studies is typically washed from the resin during the synthesis process using solvents like ethanol or methanol.

In the interest of selecting the preferred sequestration resin, both $TEPAH^{2+}$ and $TEPAH^{3+}$ conjugates to the sulfonic acid cation exchange site have been studied because these amines act as if they were coating agents as described in the previous text. In other words, they act as handles that are capable of coating additional sequestration capacity onto the remnant sulfonic acid exchange sites in the sulfonamide TEPA synthesis with either bead form or powdered form resin. Therefore, the likely preferred product would be a resin with as many covalent TEPA sites as allowed by synthesis (typically 30% to 50% of available sulfonic acid functional groups), while putting the remaining ionic sites in TEPA form. The remaining ionic sites would most likely be put in $TEPAH^{2+}$ form unless there is a competitive ion stronger than $Zn^{2+}$ in the water, for example $Fe^{3+}$, in which case the preferred form would be the $TEPAH^{3+}$.

Uses of Deligation Chemistry

The present invention utilizes a one-step de-ligation technique to remove radioactive species from a sequestration-type resin like those described herein. This process allows for the reduction in radioactivity on the resin material, thus allowing for more waste disposal options such as onsite waste processing.

In order to achieve the one-step de-ligation technique, the powdered resin synthesis of sequestration resins applicable to cobalt ion uptake, where the radwaste stream might contain elemental cobalt ion as well as $^{60}Co$ and $^{58}Co$ isotopes, must be adapted to bead resin form, as discussed above.

One unexpected result of this adaptation relates to mass transfer resistances (also known as diffusion resistances) involved in scale-up of the powdered resin synthesis from bench scale to roughly 10 kilograms also appear in bench scale synthesis using resin beads. This observation dictated that the bead form synthesis begin with macroporous resin beads instead of gel-based polymer beads. As in the powdered resin application, we begin with beads that are already qualified for use as cation exchange resins in the nuclear power industry.

Once the beads were synthesized, it was clear that model studies of the pH dependence of the sequestration multi-amine ligation and deligation chemistries apply directly to the radwaste process applications.

Regarding deligation chemistry that is pertinent to the radwaste processing uses of cobalt sequestration resins discussed in this application, we undertook a model compound study to discern the pH effects on deligation in the case where the ligand was coupled to the resin backbone via ionic association. As discussed above, one method of attaching a multiamine base ligand to a polystyrene divinylbenzenesulfonate resin backbone is to coat with a compound employing a quaternary ammonium cation in aqueous solution.

For the model study, Graver PCH was employed as the sulfonated resin and benzyl trimethyl ammonium bromide (BTAB) was employed as the quaternary cation. Following the coating of an aqueous solution of BTAB over the resin at neutral pH, the coated resin was subjected to various aqueous hydrochloric acid solutions. It was found that the addition of 3 molar HCl through 0.1 molar HCl were capable of removing BTAB from the resin. Therefore, we concluded that the quaternary ammonium (BTA+) binds to the resin sulfonate with sufficient stability to hold an attached ligand onto the resin at neutral pH. Furthermore, the coated resin was exposed to aqueous cobalt ion solutions of concentrations as high as 1000 ppm (17 millimolar). At lower concentrations comparable to plant conditions the BTA+ was not found in eluent wash water passed through the resin column. At the higher concentration range, small amounts of BTA+ did appear in the eluent wash indicating that even at neutral pH transition metal cations like cobalt can displace the quaternary cation attached to the sulfonated resin.

The model study demonstrates that there are two possible deligation methods when considering processing sequestration resins that have been saturated with radiocobalts in the radwaste plant. The first approach is a single step drop in pH and the second is a single step exposure to high concentrations of non-radioactive transition metal cations.

Accordingly, the pH dependencies of the available deligation chemistry allow conception of processes that allow the following steps in a plant:
1. pH change that removes the sequestration ligand, with or without uptake of cobalt, from the solid resin surface and frees it into liquid solution.
2. A further pH change that allows liquid solutions of ligand that contains cobalt to be separated into a solution that contains ligand, most likely ionized, and cobalt ions freely in solution.

As such, the following steps may be used to form deligation chemistry pathways for processing sequestration resins contaminated with radiocobalts.
1. Begin with a neutral solution of aqueous cobalt in contact with a sequestration resin at pressure and temperature conditions comparable to fuel pool or reactor water cleanup system in typical light water reactors. A resin example would be commercially available polystyrene divinylbenzenesulfonate linked to a sequestration ligand such as tetraethylenepentamine (TEPA) via either quaternary ammonium coupling or a covalent sulfonamide coupling to the starting resin material.
2. In the ionic coupling case, a pH change to between 5 and 3 using hydrochloric acid should cause separation of the ligand containing the radiocobalt from the resin backbone.
3. In the covalent sulfonamide coupling case, reduction in the pH below 1 should cause hydrolysis of the sulfonamide linking the ligand to the resin backbone in addition to releasing cobalt from the ligand. In a single experimental study we found that the sulfonated resin could be re-ligated successfully using the sulfonamidation chemistry described above.
4. It has been noted in the case of ionic coupling that exposure of the ligated resin to 1000 ppm concentrations of transition metal cations that might be present in radwaste processing streams should also be sufficient to decouple the quaternary ammonium coupling from the sulfonated resin backbone. The ionized sulfonated resin remaining following the deligation steps should be amenable to re-ligation via neutral pH coating. In a single preliminary study, we found that the sulfonated resin could be cycled in this manner as many as 10 times.

TEPA Sequestration Resin in Radwaste Test

The actual use of a TEPA sequestration resin in a radwaste test skid was conducted. The results suggest that the sequestration uptake chemistry for radiocobalts is at least as viable as commercially available radwaste resins designed specifically for cleanup of aqueous streams containing $^{60}Co$. See FIG. 12.

Figure 11:
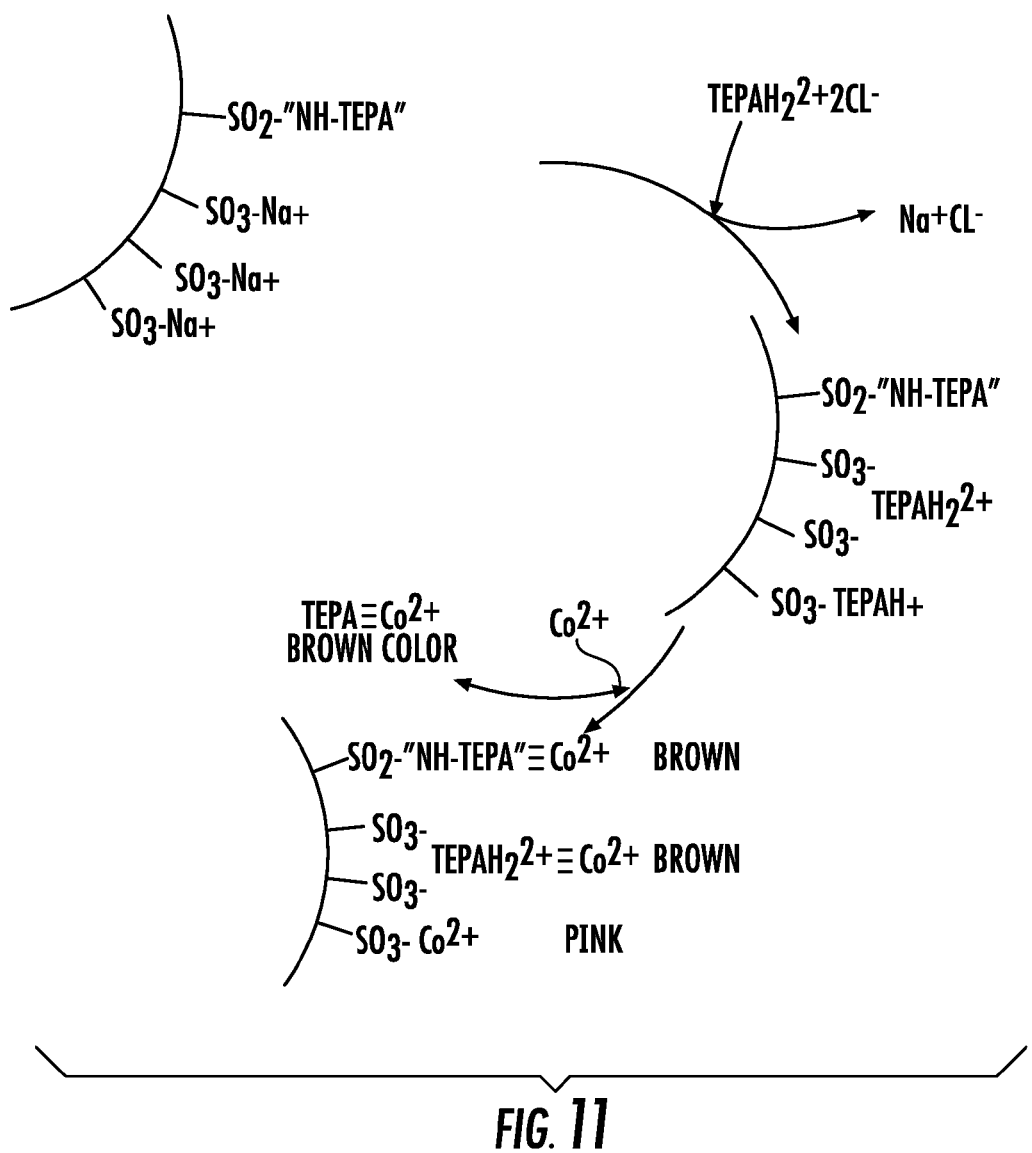
FIG. 11 shows sulfamide bound TEPA, $TEPAH_n^{n+}$ conjugate and other types of resin coordination sites. All forms of TEPA, whether covalently bound or ionically bound to the strong acid cation site will sequester ionic cobalt through the lone electron pairs on the nitrogen of the TEPA that remain uncharged.

The pH dependencies of the deligation chemistry have been mentioned above. This section describes the pH dependencies of the specific TEPA forms.
1. For reference, an aqueous solution of neutral TEPA base is pH 11 at room temperature. Consider the cation exchange resin product shown in FIG. 11 that depicts sulfonamide bound TEPA, ionic $TEPAH^+$ and $TEPAH^{2+}$ sites, and cobalt ion in aqueous suspension. Cobalt ion may be bound to any of the TEPA forms as well as to sulfonic acid cation exchange sites. As the pH is lowered to 7 by addition of acid such as HCl, an equilibrium of all sites shown in FIG. 11 will be established.
2. As the pH is lowered further to 5, the free cobalt ion will begin to leach off of the ionic sulfonate sites. The $TEPAH^+$ will also start to elute with the cobalt ion still sequestered.
3. As the pH is lowered from 5 to approximately 3, the $TEPAH^{2+}$ begins to elute with the cobalt ion still sequestered.
4. As the pH is lowered from approximately 3 to approximately 1, the $TEPAH^{3+}$ begins to elute with the cobalt still sequestered.
5. As the pH is lowered further below 1, the sulfonamide sites (that is, covalent TEPA sites) will begin to hydrolyze and the cobalt ion will begin to be driven into solution from all forms of the TEPA.

Radwaste Applications of Sequestration Resins

There are in general two types of radwaste processing concerns; first, how to maintain effluent water quality sufficient for either water discharge or recycle, and second how to process the potentially radioactive solid resin waste for transport or long term storage. As such, several radwaste processing applications using sequestration resins are described below.
1. Many radioactive waste streams contain "colloidal cobalt" roughly defined as non-filterable cobalt species that are not ionized. These typically are either not removed through routine ion exchange processes or are eluted from the breakdown on anion resin cleanup beds. Current experience indicates that if the colloidal cobalt is removed by the anion resin, it will later be released during processing of other waste streams. The possibility of using sequestration resins to selectively take up cobalt from such colloidal species exists because the binding mechanism of cobalt to the ligand is not ionic in nature. Tests of sequestration resins indicated that sequestration resin displays a decontamination factor for colloidal $^{60}Co$ of approximately 10 times other commercially available cobalt specific resins.
2. A ligand coupling mechanism based upon ionic association of sulfonic acid cation exchange resin to quaternary ammonium functionalized sequestration ligand was discussed above. With respect to radioactive waste processing, this coupling mechanism would be used as a means of rapidly screening ligand forms for optimizing cleanup resin capacity. As such, the covalent sulfonamide linkage between the resin backbone and the ligand is the preferred operational form of the sequestration resin. The reason is two-fold; first, higher concentrations of transition metal cations were seen to displace the quaternary ammonium ligand from the resin backbone in laboratory scale model studies; and second, the radwaste processing plant will not typically contain sufficient piping and vessels on site to alter pH of the radwaste stream at will.
3. Another use for the sequestration resins is volume reduction of stored radioactive waste. For example, radioactive resins that contain low capacity binding sites for cobalt could be processed to remove the cobalt and take it up irreversibly on a sequestration resin designed with much higher volumetric capacity. Once dried, this resin may be stored in smaller volume packages in the plant site end use radioactive resin storage facility.
4. The most important application of sequestration resins to radwaste processing involves classification of the waste, a requirement prior to storage or shipment. Radwaste classification indicates that $^{60}Co$ is not normally a driver for moving resins from Class A to Class B waste for purposes of characterization for waste disposal. Additionally there are no limits for $^{60}Co$ in Class B and Class C wastes. As a result, when this cobalt sequestration media is applied to waste streams that are already Class B or Class C wastes, an increased concentration of $^{60}Co$ on the sequestration resin will not change the classification of the resin for disposal purposes. Therefore, the volume reduction uses described in the previous paragraph can be accomplished without costly classification changes. However, isotopes of nickel are class drivers and therefore competitive uptake of nickel on the cobalt sequestration resin must be monitored in order to be sure no classification changes occur. Note it may be possible to design a ligand that is preferential for cobalt uptake over nickel. Conversely, a resin that specifically removes a class driver like $^{63}Ni$ over cobalt or zinc could also be very beneficial. Further, resins could be designed with ligands that were specific for each of the main class drivers including not only $^{63}Ni$, but also $^{137}Cs$ or $^{92}Sr$.
5. A specialty resin for complete removal of cobalt from liquid waste streams meant for discharge would be also be an important innovation in effluent quality control. The ability to test multiple ligand chemistries quickly using the quaternary ammonium coupling form of the cobalt sequestration resin allows cost effective design of a specialty resin to achieve zero cobalt in liquid discharge.

Figure 12:
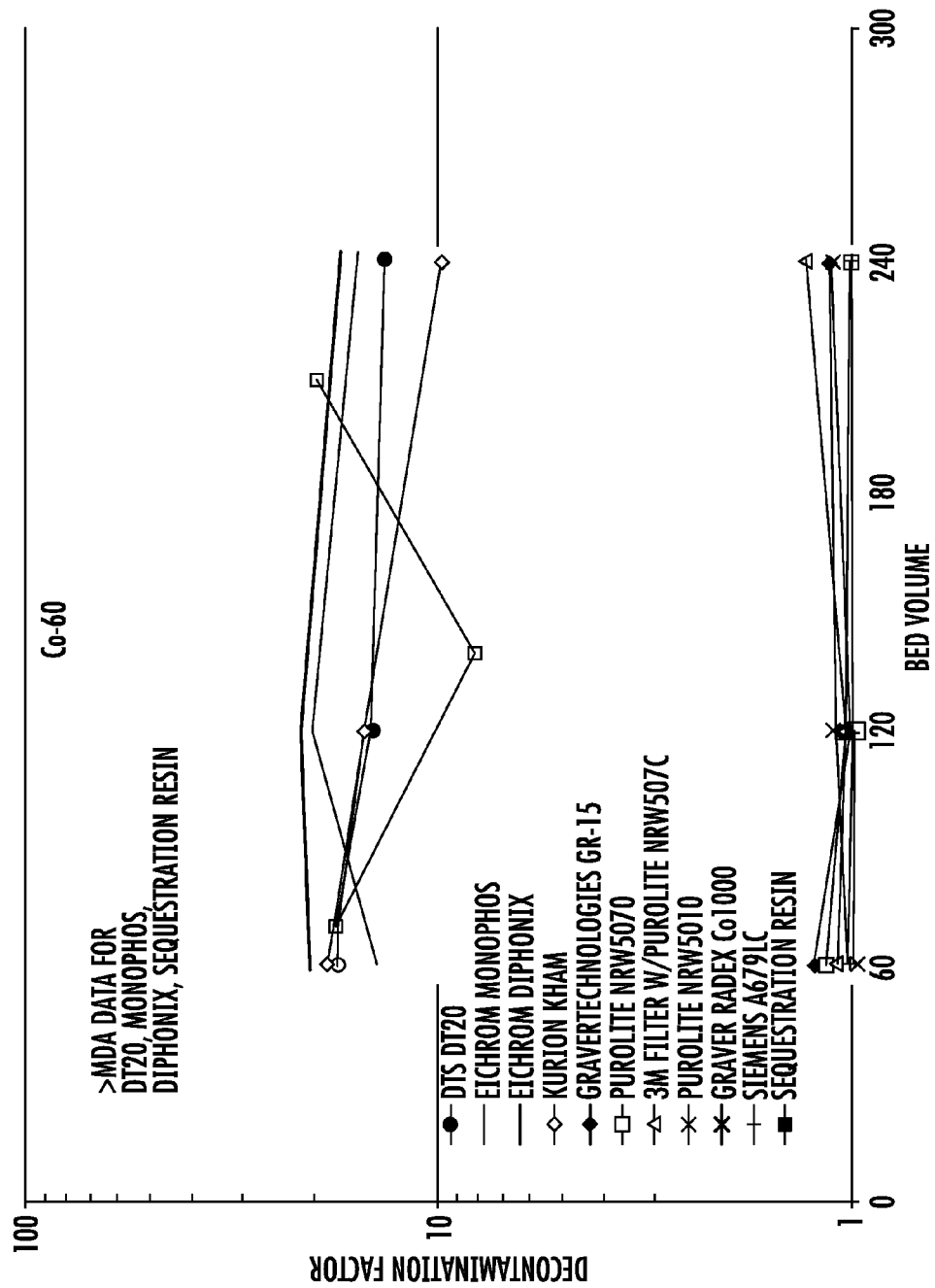
FIG. 12 shows radwaste pilot testing of sequestration resin (powder form) against commercial bead resins for $^{60}$Co decontamination in a pilot skid deployed on a radwaste processing stream at a commercial pressurized water reactor nuclear power plant.

Samples of an experimental cobalt sequestration resin (FIG. 12) were tested in a radwaste pilot skid. The test was conducted with the cobalt sequestration resin against other commercially available resins used in the industry. The commercially available resins consisted of beads and the cobalt sequestration resin was in powder form. FIG. 12 shows that the cobalt sequestration resin exhibited comparable decontamination factors as the higher performing, commercially available bead resins in $^{60}Co$ uptake. Therefore, the results suggest that the sequestration technology could be used for radwaste purposes and would likely perform even better if available in the usual bead form for such processes.
6. In PWR plants, the personnel dose experienced on the spent fuel pool bridge is determined by $^{58}Co$. A bead resin form of a sequestration ligand cobalt cleanup resin used in the PWR shutdown that irreversibly removes $^{58}$Co in one pass could be achievable by using polymeric ligands that geometrically increase cleanup resin capacity. Any improved efficiency in removing $^{58}$Co from the reactor coolant system during PWR shutdown will directly improve outage duration.

Finally, it is possible to use radwaste specific sequestration resins in fields outside of nuclear power, for example in medical waste wherein resins specific to radioisotopes used in treatment and diagnostics might be designed. It is also possible that such resins be coupled with selective downstream processing that would allow isotopic separations.

The foregoing has described a methodology for the cleanup of ionic species such as cobalt and nickel in nuclear power plant aqueous streams using a sequestration resin material. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A method for clean-up of radioactivity in a reactor coolant contained in a nuclear power plant, comprising the steps of:
   (a) providing a sequestration resin for removal of radioisotopes of transition metal impurities contained in a reactor coolant system of a nuclear power reactor, the sequestration resin comprising linear multi-amine ligand sites covalently coupled to a sulfonic acid-based polymer resin by a sulfonamide linkage, wherein the linear multi-amine ligand sites are coupled to the sulfonic acid-based polymer resin in a configuration in which lone pair electrons of nitrogen exist on the ligand sites, such that the resultant sequestration resin is capable of complexation of transition metal cations by uncharged organo-metallic complexation; and
   (b) distributing the sequestration resin into a clean-up system for reactor coolant contained in the reactor coolant system such that the sequestration resin complexes the radioisotopes using the lone nitrogen electron pairs, so as to remove the radioisotopes from the coolant.

2. The method according to claim 1, wherein the sequestration resin is in powdered form.

3. The method according to claim 1, wherein removal of the radioisotopes reduces exposure levels of radioactivity to workers.

4. The method according to claim 1, wherein the radioisotopes of transition metal impurities include metal cations selected from the group consisting of cobalt, activated cobalt, and nickel.

5. The method according to claim 1, further including the step of floccing the sequestration resin with powder anion exchange resin to assure a uniform precoat.

6. The method according to claim 5, further including the step of determining an optimized amount of powder anion exchange resin to mix with the sequestration resin to promote precoatability onto filter demineralizer septa.

7. The method according to claim 5, further including the step of using the flocced sequestration resin as an overlay over a base mix.

8. The method according to claim 1, further including the steps of:
   (a) determining an amount of anion resin to mix with the sequestration resin;
   (b) floccing the sequestration resin with the anion exchange resin to assure a uniform precoat; and
   (c) overlaying the flocced sequestration resin over a base mix.

9. The method according to claim 1, further including the step of precoating filter demineralizers for reactor water with the sequestration resin.

10. The method according to claim 1, wherein plant process streams include reactor water and spent fuel pool water.

11. The method according to claim 1, wherein the sequestration resin is in bead form.

12. The method according to claim 11, further including the steps of determining an amount of anion resin for a mixed bed of a deep bed demineralizer.

13. The method according to claim 12, further including the step of overlaying the bead form sequestration resin over the mixed bed.

14. A method for clean-up of radioactivity in a reactor coolant contained in a nuclear power plant, comprising the steps of:
   (a) providing a sequestration resin for removal of cobalt radioisotopes of transition metal impurities contained in a reactor coolant system of a nuclear power reactor, the sequestration resin comprising linear multi-amine ligand sites covalently coupled to a sulfonic acid-based polymer resin by a sulfonamide linkage, wherein the linear multi-amine ligand sites are coupled to the sulfonic acid-based polymer resin in a configuration in which lone pair electrons of nitrogen exist on the ligand sites, such that the resultant sequestration resin is capable of complexation of transition metal cations by uncharged organo-metallic complexation; and
   (b) distributing the sequestration resin into a clean-up system for reactor coolant contained in the reactor coolant system such that the sequestration resin complexes the cobalt radioisotopes using the lone nitrogen electron pairs in a square planar geometric coordination, so as to remove the cobalt radioisotopes from the coolant.

* * * * *